(12) United States Patent
Oguro et al.

(10) Patent No.: US 12,227,179 B2
(45) Date of Patent: Feb. 18, 2025

(54) VEHICLE CONTROL DEVICE AND VEHICLE CONTROL METHOD

(71) Applicant: HONDA MOTOR CO., LTD., Tokyo (JP)

(72) Inventors: Chihiro Oguro, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 17/988,804

(22) Filed: Nov. 17, 2022

(65) Prior Publication Data

US 2023/0174060 A1 Jun. 8, 2023

(30) Foreign Application Priority Data

Dec. 7, 2021 (JP) ................................. 2021-198320

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 30/143* (2013.01);
(Continued)

(58) Field of Classification Search
CPC ............... B60W 30/12; B60W 30/143; B60W 30/18163; B60W 30/182; B60W 10/20; B60W 40/06; B60W 2552/53
See application file for complete search history.

(56) References Cited

U.S. PATENT DOCUMENTS

2016/0187879 A1* 6/2016 Mere .................... B60W 30/12
701/23
2017/0010618 A1* 1/2017 Shashua ............. G01C 21/1652
(Continued)

FOREIGN PATENT DOCUMENTS

JP          10-300494        11/1998
JP        2000-105898         4/2000
(Continued)

OTHER PUBLICATIONS

Japanese Office Action for Japanese Patent Application No. 2021-198320 mailed Apr. 18, 2023.

*Primary Examiner* — George C Jin
(74) *Attorney, Agent, or Firm* — Amin, Turocy & Watson, LLP

(57) ABSTRACT

A vehicle control device includes: a recognizer configured to recognize a surrounding situation of a vehicle; a driving controller; an acquirer configured to acquire map information including lane information near the vehicle and reference information for identifying a position of the vehicle; and an identifier configured to identify a traveling lane of the vehicle out of one or more lanes included in a road on which the vehicle is traveling from the map information. The identifier is configured to set a reference lane on which the vehicle travels based on the number of lanes acquired from the map information and type information of lane markings near the vehicle recognized or information of an object capable of identifying a lane position and to identify the traveling lane of the vehicle based on the set reference lane, behavior of the vehicle, and an increase or decrease in the number of lanes.

15 Claims, 10 Drawing Sheets

(51) Int. Cl.
  *B60W 30/14* (2006.01)
  *B60W 30/18* (2012.01)
  *B60W 30/182* (2020.01)
  *B60W 40/06* (2012.01)
  *G06V 20/56* (2022.01)

(52) U.S. Cl.
  CPC .... *B60W 30/18163* (2013.01); *B60W 30/182* (2013.01); *B60W 40/06* (2013.01); *G06V 20/588* (2022.01); *B60W 2420/403* (2013.01); *B60W 2552/53* (2020.02); *B60W 2556/40* (2020.02)

(56) References Cited

U.S. PATENT DOCUMENTS

| | | | |
|---|---|---|---|
| 2017/0028995 A1 | 2/2017 | Mori et al. | |
| 2018/0011497 A1* | 1/2018 | Schroeder | B62D 15/025 |
| 2019/0025819 A1* | 1/2019 | Ferguson | G05D 1/0088 |
| 2020/0047766 A1* | 2/2020 | Ko | B60W 10/06 |
| 2021/0064057 A1* | 3/2021 | Eldar | G01C 21/3626 |
| 2021/0300392 A1* | 9/2021 | Shionome | G07C 5/0816 |
| 2022/0204026 A1* | 6/2022 | Kim | B60W 60/0015 |

FOREIGN PATENT DOCUMENTS

| | | |
|---|---|---|
| JP | 2010-221859 | 10/2010 |
| JP | 2013-032953 | 2/2013 |
| JP | 2017-030555 | 2/2017 |
| JP | 2018-151822 | 9/2018 |
| JP | 2019-060669 | 4/2019 |

\* cited by examiner

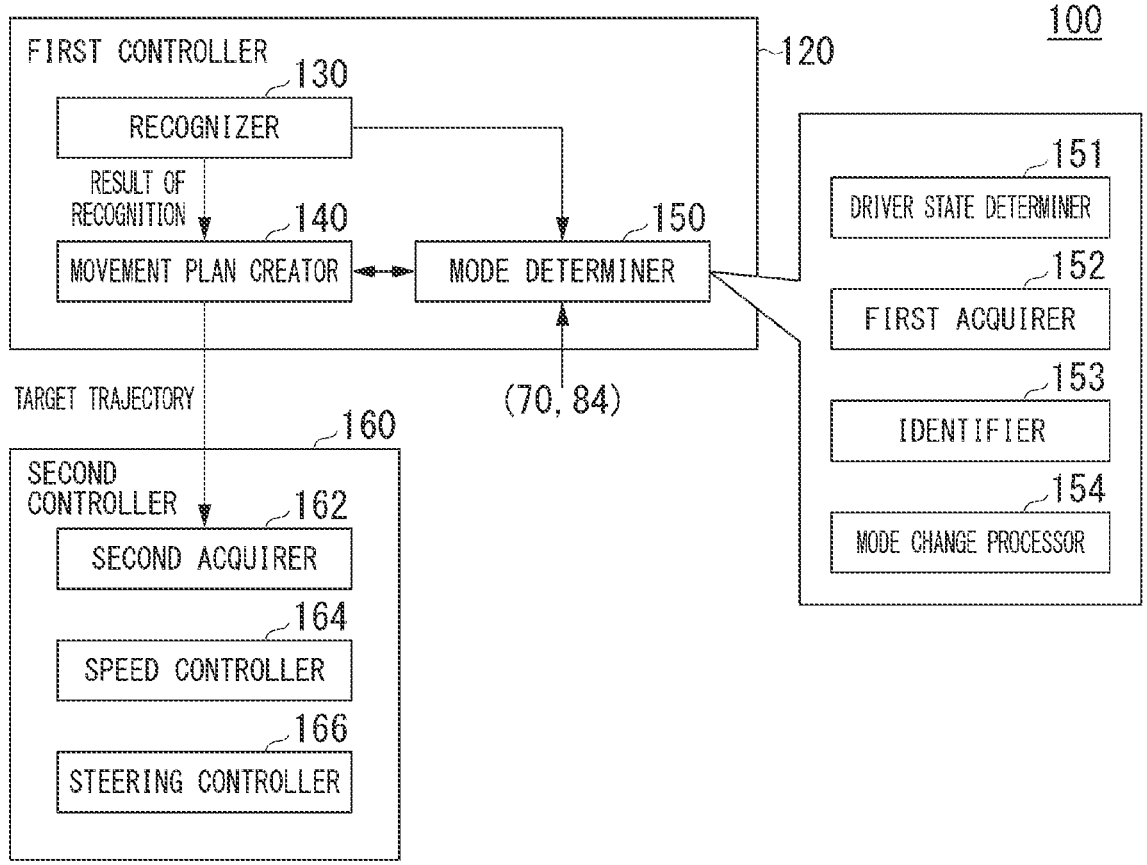

| BEHAVIOR | LEFT REFERENCE LANE NUMBER | RIGHT REFERENCE LANE NUMBER |
|---|---|---|
| LKAS MAINTENANCE | PREVIOUS LANE NUMBER ||
| IN EXECUTION OF LEFT LC | PREVIOUS LANE NUMBER ||
| IN EXECUTION OF RIGHT LC | PREVIOUS LANE NUMBER ||
| COMPLETION OF LEFT LC | PREVIOUS LANE NUMBER - 1 | PREVIOUS LANE NUMBER + 1 |
| COMPLETION OF RIGHT LC | PREVIOUS LANE NUMBER + 1 | PREVIOUS LANE NUMBER - 1 |
| UNDETERMINED | 0 (UNDETERMINED) ||

| INCREASE/DECREASE DETAILS | LEFT REFERENCE LANE NUMBER | RIGHT REFERENCE LANE NUMBER |
|---|---|---|
| LEFT DECREASE | (PREVIOUS LANE NUMBER) - (NUMBER OF DECREASED LANES) | PREVIOUS LANE NUMBER |
| RIGHT DECREASE | PREVIOUS LANE NUMBER | (PREVIOUS LANE NUMBER) - (NUMBER OF DECREASED LANES) |
| LEFT INCREASE | (PREVIOUS LANE NUMBER) + (NUMBER OF INCREASED LANES) | PREVIOUS LANE NUMBER |
| RIGHT INCREASE | PREVIOUS LANE NUMBER | (PREVIOUS LANE NUMBER) + (NUMBER OF INCREASED LANES) |
| NO INCREASE/DECREASE | PREVIOUS LANE NUMBER ||

VEHICLE CONTROL DEVICE AND VEHICLE CONTROL METHOD

CROSS-REFERENCE TO RELATED APPLICATION

Priority is claimed on Japanese Patent Application No. 2021-198320, filed Dec. 7, 2021, the content of which is incorporated herein by reference.

BACKGROUND

Field of the Invention

The present invention relates to a vehicle control device, a vehicle control method, and a storage medium.

Description of Related Art

Recently, autonomous driving of recognizing a surrounding situation of a vehicle and automatically controlling traveling of the vehicle has been studied. In this regard, techniques of detecting information on a traveling environment by recognizing marking states on a road, determining control details by estimating dividing lines for dividing a current traveling lane from line types stored in advance in a storage, or determining a position of a vehicle using a recognition result from a camera and map information are known (for example, see Japanese Unexamined Patent Application, First Publication No. 2000-105898, Japanese Unexamined Patent Application, First Publication No. 2010-221859, Japanese Unexamined Patent Application, First Publication No. H10-300494, and Japanese Unexamined Patent Application, First Publication No. 2013-032953).

SUMMARY

However, in the related art, when the number of lanes increases or decreases or behavior of a vehicle changes such as lane change, a traveling lane of the vehicle may not be accurately identified.

Aspects of the present invention were invented in consideration of the aforementioned circumstances and an objective thereof is to provide a vehicle control device, a vehicle control method, and a storage medium that can accurately identify a traveling lane of a vehicle.

A vehicle control device, a vehicle control method, and a storage medium according to the present invention employ the following configurations.

(1) According to an aspect of the present invention, there is provided a vehicle control device including: a recognizer configured to recognize a surrounding situation of a vehicle; a driving controller configured to control one or both of steering and speed of the vehicle on the basis of the surrounding situation recognized by the recognizer; an acquirer configured to acquire map information including lane information near the vehicle and reference information for identifying a position of the vehicle; and an identifier configured to identify a traveling lane of the vehicle out of one or more lanes included in a road on which the vehicle is traveling from the map information on the basis of the reference information, wherein the identifier is configured to set a reference lane on which the vehicle travels on the basis of the number of lanes of the road acquired from the map information and type information of lane markings near the vehicle recognized by the recognizer or information of an object capable of identifying a lane position and to identify the traveling lane of the vehicle on the basis of the set reference lane, behavior of the vehicle, and an increase or decrease in the number of lanes of the road.

(2) According to another aspect of the present invention, there is provided a vehicle control device including: a recognizer configured to recognize a surrounding situation of a vehicle; a driving controller configured to control one or both of steering and speed of the vehicle on the basis of the surrounding situation recognized by the recognizer; an acquirer configured to acquire map information including lane information near the vehicle and reference information for identifying a position of the vehicle; and an identifier configured to identify a traveling lane of the vehicle out of one or more lanes included in a road on which the vehicle is traveling from the map information on the basis of the reference information, wherein the identifier is configured to identify the traveling lane in a merging or branching section on the basis of a position of the traveling lane before the vehicle reaches the merging or branching section and information indicating whether the vehicle has performed lane change when it is determined from the map information that the merging or branching section is located in front of the vehicle.

(3) In the aspect of (1), the driving controller may be configured to cause the vehicle to travel by operating in one of a plurality of driving modes including at least a first driving mode and a second driving mode in which a heavier task than that in the first driving mode is imposed on an occupant of the vehicle, the driving controller may be configured to perform the first driving mode when the traveling lane of the vehicle is identified by the identifier, and the driving controller may be configured to perform the second driving mode when the traveling lane of the vehicle is not identified by the identifier.

(4) In the aspect of (1), the driving controller may be configured to cause the vehicle to travel by performing one driving mode of a plurality of driving modes with different tasks imposed on an occupant of the vehicle and to cause the vehicle to travel by maintaining the driving mode which is being performed when the traveling lane of the vehicle is not identified by the identifier.

(5) In the aspect of (1), the identifier may be configured to identify the traveling lane of the vehicle on the basis of a combination of types of lane markings for defining one or more lanes near the vehicle recognized by the recognizer.

(6) In the aspect of (1), the identifier may be configured to acquire a section in which the number of lanes in front of the vehicle increases or decreases from the map information and to identify the traveling lane of the vehicle on the basis of an increase or decrease and an increasing or decreasing direction in the number of parallel lanes in the acquired section.

(7) In the aspect of (1), the identifier may be configured to reset information of the identified traveling lane when the traveling lane of the vehicle identified on the basis of the reference lane, the behavior of the vehicle, and the increase or decrease in the number of lanes of the road is different from the traveling lane of the vehicle identified on the basis of the lane markings near the vehicle recognized by the recognizer.

(8) In the aspect of (7), the identifier may be configured to identify the traveling lane of the vehicle on the basis of a shape of a road on which the vehicle travels and the behavior of the vehicle when the information of the traveling lane is reset.

(9) In the aspect of (2), when a merging or branching section is located in front of the vehicle with reference to the map information, the traveling lane before the vehicle reaches the section is one of right and left end lanes included in the road, and it is determined that the vehicle has not performed lane change, the identifier may be configured to identify the traveling lane of the vehicle to be a lane parallel to a merging road or a branching road in the section.

(10) In the aspect of (3), the identifier may be configured to cause the driving controller to perform the second driving mode when the vehicle is traveling on a lane parallel to a merging road or branching road and a state in which it is determined that the traveling lane is none of right and left end lanes on the basis of type information of lane markings recognized by the recognizer is maintained for a predetermined time or longer.

(11) According to another aspect of the present invention, there is provided a vehicle control method that is performed by a computer, the vehicle control method including: recognizing a surrounding situation of a vehicle; controlling one or both of steering and speed of the vehicle on the basis of the recognized surrounding situation; acquiring map information including lane information near the vehicle and reference information for identifying a position of the vehicle; identifying a traveling lane of the vehicle out of one or more lanes included in a road on which the vehicle is traveling from the map information on the basis of the reference information; setting a reference lane on which the vehicle travels on the basis of the number of lanes of the road acquired from the map information and type information of recognized lane markings near the vehicle or information of an object capable of identifying a lane position; and identifying the traveling lane of the vehicle on the basis of the set reference lane, behavior of the vehicle, and an increase or decrease in the number of lanes of the road.

(12) According to another aspect of the present invention, there is provided a vehicle control method that is performed by a computer, the vehicle control method including: recognizing a surrounding situation of a vehicle; controlling one or both of steering and speed of the vehicle on the basis of the recognized surrounding situation; acquiring map information including lane information near the vehicle and reference information for identifying a position of the vehicle; identifying a traveling lane of the vehicle out of one or more lanes included in a road on which the vehicle is traveling from the map information on the basis of the reference information; and identifying the traveling lane of the vehicle to be a lane parallel to a merging road or a branching road in a merging or branching section when the merging or branching section is located in front of the vehicle on the basis of the map information, the traveling lane before the vehicle reaches the merging or branching section is one of right and left end lanes included in the road, and it is determined that the vehicle has not performed lane change.

(13) According to another aspect of the present invention, there is provided a non-transitory computer-readable storage medium storing a program causing a computer to perform: recognizing a surrounding situation of a vehicle; controlling one or both of steering and speed of the vehicle on the basis of the recognized surrounding situation; acquiring map information including lane information near the vehicle and reference information for identifying a position of the vehicle; identifying a traveling lane of the vehicle out of one or more lanes included in a road on which the vehicle is traveling from the map information on the basis of the reference information; setting a reference lane on which the vehicle travels on the basis of the number of lanes of the road acquired from the map information and type information of recognized lane markings near the vehicle or information of an object capable of identifying a lane position; and identifying the traveling lane of the vehicle on the basis of the set reference lane, behavior of the vehicle, and an increase or decrease in the number of lanes of the road.

(14) According to another aspect of the present invention, there is provided a non-transitory computer-readable storage medium storing a program causing a computer to perform: recognizing a surrounding situation of a vehicle; controlling one or both of steering and speed of the vehicle on the basis of the recognized surrounding situation; acquiring map information including lane information near the vehicle and reference information for identifying a position of the vehicle; identifying a traveling lane of the vehicle out of one or more lanes included in a road on which the vehicle is traveling from the map information on the basis of the reference information; and identifying the traveling lane of the vehicle to be a lane parallel to a merging road or a branching road in a merging or branching section when the merging or branching section is located in front of the vehicle on the basis of the map information, the traveling lane before the vehicle reaches the merging or branching section is one of right and left end lanes included in the road, and it is determined that the vehicle has not performed lane change.

According to the aspects of (1) to (14), it is possible to accurately identify a traveling lane of a vehicle.

BRIEF DESCRIPTION OF THE DRAWINGS

FIG. 2 is a diagram illustrating functional configurations of a first controller and a second controller according to the embodiment.

FIG. 3 is a diagram illustrating an example of correspondence between driving modes and control states of a vehicle and tasks.

FIG. 6 is a diagram illustrating an example of details of a lane change correction table.

FIG. 7 is a diagram illustrating an example of details of a lane increase/decrease correction table.

DESCRIPTION OF EMBODIMENTS

Hereinafter, a vehicle control device, a vehicle control method, and a storage medium according to an embodiment of the present invention will be described with reference to the accompanying drawings.

Entire Configuration

Figure 1:
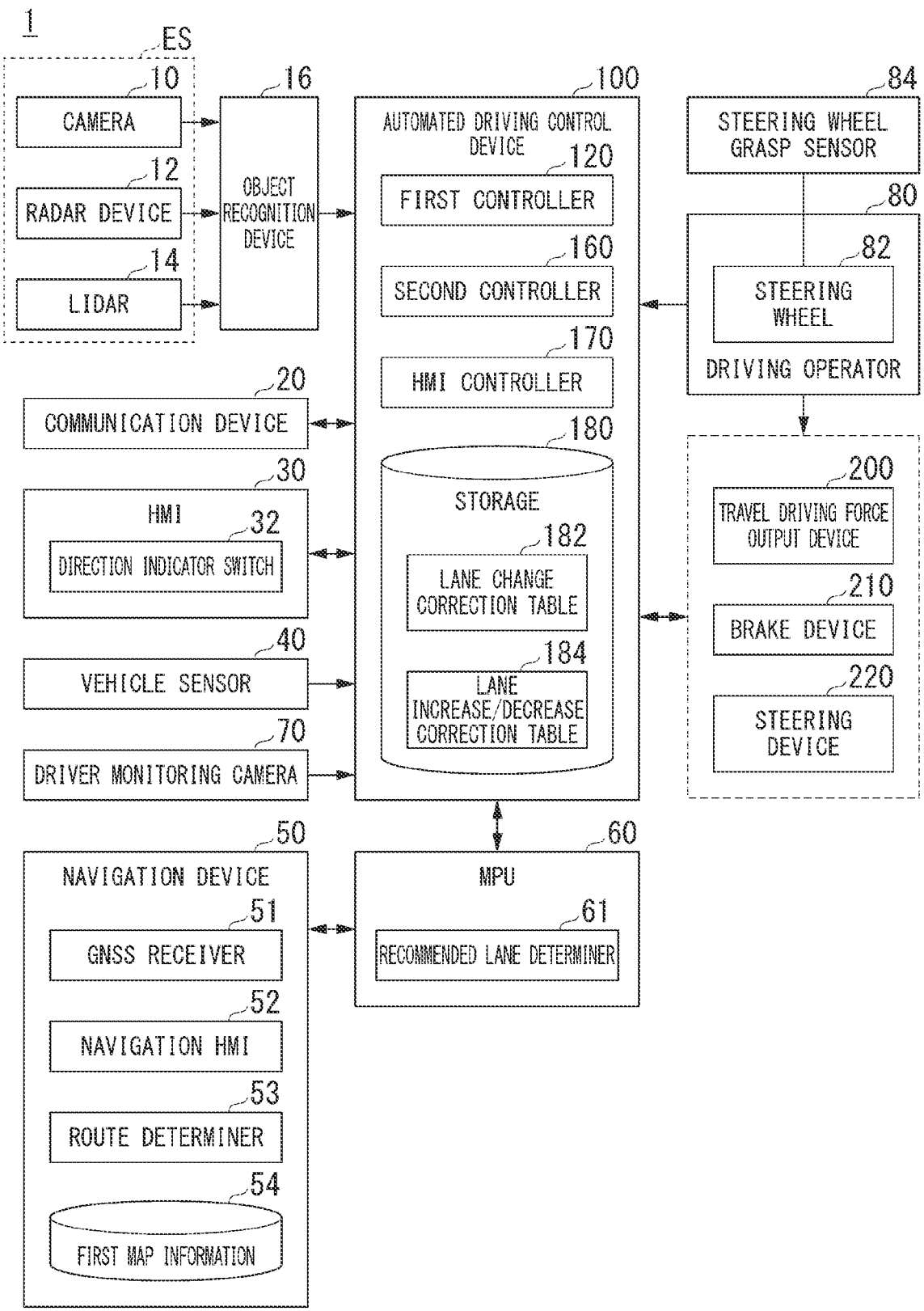
FIG. 1 is a diagram illustrating a configuration of a vehicle system employing a vehicle control device according to an embodiment.

FIG. 1 is a diagram illustrating a configuration of a vehicle system 1 employing a vehicle control device according to an embodiment. A vehicle in which the vehicle system 1 is mounted (hereinafter referred to as a vehicle M) is, for example, a vehicle with two wheels, three wheels, or four wheels and a drive source thereof is an internal combustion engine such as a diesel engine or a gasoline engine, an electric motor, or a combination thereof. The electric motor operates using electric power generated by a power generator connected to the internal combustion engine or using electric power discharged from a secondary battery or a fuel cell. For example, an embodiment in which the vehicle control device is applied to an automated driving vehicle will be described in the following description. Automated driving is driving control which is performed by autonomously controlling one or both of steering and acceleration/deceleration of the vehicle M. The driving control of the vehicle M may include various types of driving support such as adaptive cruise control (ACC), and auto lane changing (ALC), lane keeping assistance system (LKAS). Partial or whole manual driving of an automated driving vehicle may be controlled by an occupant (a driver).

The vehicle system 1 includes, for example, a camera (an example of an image capturer) 10, a radar device 12, a Light Detection and Ranging (LIDAR) device 14, an object recognition device 16, a communication device 20, a human-machine interface (HMI) 30, a vehicle sensor 40, a navigation device 50, a map positioning unit (MPU) 60, a driver monitoring camera 70, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto. A combination of the camera 10, the radar device 12, and the LIDAR device 14 is an example of an "external sensor ES." The external sensor ES may include another detector that recognizes a surrounding situation of the vehicle, or may include the object recognition device 16. The HMI 30 is an example of an "output device." The automated driving control device 100 is an example of a "vehicle control device."

The camera 10 is, for example, a digital camera using a solid-state imaging device such as a charge coupled device (CCD) or a complementary metal oxide semiconductor (CMOS). The camera 10 is attached to an arbitrary position on the vehicle M. For example, when the front view of the vehicle M is imaged, the camera 10 is attached to an upper part of a front windshield, a rear surface of a rearview mirror, or the like. When the rear view of the vehicle M is imaged, the camera 10 is attached to an upper part of a rear windshield, a back door, or the like. When the lateral view and the rear-later view of the vehicle M is imaged, the camera 10 is attached to a door mirror or the like. The camera 10 images the surroundings of the vehicle M, for example, periodically and repeatedly. The camera 10 may be a stereoscopic camera. The camera 10 may include a plurality of cameras (for example, a first camera and a second camera), and may capture an image in the same direction using the plurality of cameras or may usually capture an image using the first camera and capture an image using the second camera or both the first camera and the second camera when predetermined conditions are satisfied. The predetermined conditions include, for example, a condition that lane markings (hereinafter referred to as markings) for defining a lane or the like included in a road on which the vehicle M travels from an image captured by the camera (hereinafter referred to as a camera image).

The radar device 12 radiates radio waves such as millimeter waves to the surroundings of the vehicle M, detects radio waves (reflected waves) reflected by an object, and detects at least a position (a distance and a direction) of the object. The radar device 12 is attached to an arbitrary position on the vehicle M. The radar device 12 may detect a position and a speed of an object using a frequency modulated continuous wave (FM-CW) method.

The LIDAR device 14 radiates light (or electromagnetic waves of wavelengths close to light) to the surroundings of the vehicle M and measures scattered light. The LIDAR device 14 detects a distance to an object on the basis of a time from radiation of light to reception of light. The radiated light is, for example, a pulse-like laser beam. The LIDAR device 14 is attached to an arbitrary position on the vehicle M.

The object recognition device 16 performs a sensor fusion process on results of detection from some or all of the camera 10, the radar device 12, and the LIDAR device 14 included in the external sensor ES and recognizes a position, a type, a speed, and the like of an object. The object recognition device 16 outputs the result of recognition to the automated driving control device 100. The object recognition device 16 may output the results of detection from the camera 10, the radar device 12, and the LIDAR device 14 to the automated driving control device 100 without any change. The object recognition device 16 may be omitted from the vehicle system 1.

The communication device 20 communicates with other vehicles near the vehicle M, for example, using a cellular network, a Wi-Fi network, Bluetooth (registered trademark), or dedicated short range communication (DSRC) or communicates with various server devices via radio base stations.

The HMI 30 presents various types of information to an occupant of the vehicle M and receives an input operation from the occupant under the control of an HMI controller 170. The HMI 30 includes, for example, various display devices, speakers, switches, microphones, buzzers, touch panels, and keys. Examples of the display devices include a liquid crystal display (LCD) and an organic electroluminescence (EL) display device. The display device is provided in the vicinity of the front of a driver's seat (a seat closest to the steering wheel) on an instrument panel and is installed at a position which can be seen by an occupant through a gap of the steering wheel or over the steering wheel. The display device may be installed at the center of the instrument panel. The display device may be a head-up display (HUD). The HUD allows an occupant sitting on the driver's seat to see a virtual image by projecting an image to a part of a front windshield in front of the driver's seat. The display device displays an image which his generated by the HMI controller 170 which will be described later. The HMI 30 may include a driving switch that switches between automated driving and manual driving with an occupant intervening therein. Examples of the switch include a direction indicator switch 32. The direction indicator switch 32 is provided, for example, on a steering column or the steering wheel. The direction indicator switch 32 is an example of an operator that receives, for example, an input of a lane change instruction for the vehicle M from an occupant.

The vehicle sensor 40 includes a vehicle speed sensor that detects a speed of the vehicle M, an acceleration sensor that detects an acceleration, a yaw rate sensor that detects an angular velocity around a vertical axis, and a direction sensor that detects a direction of the vehicle M. The vehicle sensor 40 may include a steering angle sensor that detects a steering angle of the vehicle M (which may be an angle of a steering wheel or an operating angle of the steering wheel). The vehicle sensor 40 may include a position sensor that acquires a position of the vehicle M. The position sensor is, for example, a sensor that acquires position information (longitude and latitude information) from a global positioning system (GPS) device. The position sensor may be a sensor that acquires position information using a global navigation satellite system (GNSS) receiver 51 of a navigation device 50.

The navigation device 50 includes, for example, a GNSS receiver 51, a navigation HMI 52, and a route determiner 53. The navigation device 50 stores first map information 54 in a storage device such as a hard disk drive (HDD) or a flash memory. The GNSS receiver 51 identifies a position of the vehicle M on the basis of signals received from GNSS satellites. The position of the vehicle M may be identified or complemented by an inertial navigation system (INS) using the output of the vehicle sensor 40. The navigation HMI 52 includes a display device, a speaker, a touch panel, and keys. The navigation HMI 52 may be partially or wholly shared by the HMI 30. For example, the route determiner 53 determines a route (hereinafter referred to as a route on a map) from the position of the vehicle M identified by the GNSS receiver 51 (or an input arbitrary position) to a destination input by an occupant using the navigation HMI 52 with reference to the first map information 54. The first map information 54 includes, for example, information to which information on lanes for each road is added (hereinafter referred to as lane information). The lane information includes, for example, nodes indicating starting and ending of each road section and links indicating a road shape between nodes. The lane information may include the number of lanes (the number of parallel lanes) in a predetermined section such as a unit of road or an increase/decrease in the number of lanes and an increasing/decreasing direction of the number of lanes (information indicating on which side in an extending direction of a road the number of lanes increases or decreases). The first map information 54 may include a distance or a curvature of a road section, a road type (for example, an expressway or a regular road), and point of interest (POI) information. The route on a map is output to the MPU 60. The navigation device 50 may perform route guidance using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server. The first map information 54 may be stored in a storage 180 instead of the navigation device 50.

The MPU 60 includes, for example, a recommended lane determiner 61. The recommended lane determiner 61 divides a route on a map provided from the navigation device 50 into a plurality of blocks (for example, every 100 [m] in a vehicle travel direction) and determines a recommended lane for each block with reference to lane information of the first map information 54. The recommended lane determiner 61 may determine the recommended lane for each road stored in the first map information 54. The recommended lane determiner 61 determines in which lane from the leftmost (or the rightmost) the vehicle is to travel. When there is a branching point in the route on a map, the recommended lane determiner 61 determines the recommended lane such that the vehicle M travels along a rational route for traveling to a branching destination.

The driver monitoring camera 70 is, for example, a digital camera using a solid-state imaging device such as a CCD or a CMOS. The driver monitoring camera 70 is attached to an arbitrary position on the vehicle M in a place and a direction in which the head of an occupant (hereinafter referred to as a driver) sitting on a driver's seat of the vehicle M can be imaged from the front (such that the face of the driver is imaged). For example, the driver monitoring camera 70 is attached to an upper part of a display device which is provided at the central part of an instrument panel of the vehicle M.

The driving operator 80 includes, for example, an accelerator pedal, a brake pedal, a shift lever, and other operators in addition to a steering wheel 82. A sensor that detects an amount of operation or performing of an operation is attached to the driving operator 80. Results of detection of the sensor are output to the automated driving control device 100 or output to some or all of the travel driving force output device 200, the brake device 210, and the steering device 220. The steering wheel 82 is an example of an "operator that receives a driver's steering operation." The operator does not have to have a ring shape and may have a shape of a deformed steering, a joystick, a button, or the like. A steering wheel grasp sensor 84 is attached to the steering wheel 82. The steering wheel grasp sensor 84 is realized by a capacitance sensor or the like and outputs a signal indicating whether a driver grasps the steering wheel 82 (which means contacting the steering wheel with a force applied thereto) to the automated driving control device 100.

The automated driving control device 100 includes, for example, a first controller 120, a second controller 160, an HMI controller 170, and a storage 180. The first controller 120, the second controller 160, and the HMI controller 170 are realized, for example, by causing a hardware processor such as a central processing unit (CPU) to execute a program (software). Some or all of such elements may be realized by hardware (which includes circuitry) such as a large scale integration (LSI), an application-specific integrated circuit (ASIC), or a field-programmable gate array (FPGA), or a graphics processing unit (GPU) or may be realized in cooperation of software and hardware. The program may be stored in a storage device (a storage device including a non-transitory storage medium) such as an HDD or a flash memory of the automated driving control device 100 in advance, or may be stored in a removable storage medium such as a DVD or a CD-ROM and installed in the HDD or the flash memory of the automated driving control device 100 by attaching the removable storage medium (non-transitory storage medium) to a drive device. A combination of a movement plan creator 140 and the second controller 160 is an example of a "driving controller." The HMI controller 170 is an example of an "output controller."

The storage 180 may be realized by the aforementioned various storage devices or a solid-state drive (SSD), an electrically erasable programmable read only memory (EE-PROM), a read only memory (ROM), a random access memory (RAM), or the like. For example, a lane change correction table 182, a lane increase/decrease correction table 184, programs, and various types of other information are stored in the storage 180. The lane change correction table 182 is a table which is referred to in order to correct a traveling lane of the vehicle M when the vehicle M performs a change of behavior such as lane change. The lane increase/decrease correction table 184 is a table which is referred to in order to correct the traveling lane of the vehicle M when the number of lanes of a road including the traveling lane of the vehicle M increases or decreases. Details of the tables will be described later. The first map information 54 may be stored in the storage 180.

FIG. 2 is a diagram illustrating functional configurations of the first controller 120 and the second controller 160 according to the embodiment. The first controller 120 includes, for example, a recognizer 130, a movement plan creator 140, and a mode determiner 150. For example, the first controller 120 realizes a function based on artificial intelligence (AI) and a function based on a predetermined model together. For example, a function of "recognizing a crossing" may be realized by performing recognition of a crossing based on deep learning or the like and recognition based on predetermined conditions (such as signals and road signs which can be pattern-matched) together, scoring both recognitions, and comprehensively evaluating the recognitions. Accordingly, reliability of automated driving is secured.

The recognizer 130 recognizes states such as a position, a speed, and an acceleration of an object near the vehicle M on the basis of information input from the external sensor ES. For example, a position of an object is recognized as a position in an absolute coordinate system with an origin set to a representative point of the vehicle M (such as the center of gravity or the center of a drive shaft) and is used for control. A position of an object may be expressed as a representative point such as the center of gravity or a corner of the object or may be expressed as an area. A "state" of an object may include an acceleration or a jerk of the object or a "moving state" (for example, whether lane change is being performed or whether lane change is going to be performed) thereof.

The recognizer 130 recognizes, for example, a lane (a traveling lane) in which the vehicle M is traveling. For example, the recognizer 130 recognizes right and left lane markings of the vehicle M from a camera image captured by the camera 10 and recognizes the traveling lane on the basis of positions of the recognized lane markings. The recognizer 130 is not limited to the lane markings, but may recognize the traveling lane by recognizing objects capable of identifying a lane position (such as traveling lane boundaries or road boundaries) including edges of roadsides, curbstones, median strips, guard rails, fences, walls, and the like. In this recognition, the position of the vehicle M acquired from the navigation device 50 and the result of processing from the INS may be considered. The recognizer 130 may recognize a stop line, an obstacle, a red signal, a toll gate, or other road events.

The recognizer 130 recognizes a position or a direction of the vehicle M with respect to a traveling lane at the time of recognition of the traveling lane. The recognizer 130 may recognize, for example, a separation of a reference point of the vehicle M from the lane center and an angle of the traveling direction of the vehicle M with respect to a line formed by connecting the lane centers as the position and the direction of the vehicle M with respect to the traveling lane. Instead, the recognizer 130 may recognize a position of a reference point of the vehicle M with respect to one side line of the traveling lane (a lane marking or a road boundary) or the like as the position of the vehicle M with respect to the traveling lane. Recognition of the traveling lane in the recognizer 130 or recognition of the position or posture of the vehicle M with respect to the traveling lane may be performed by an identifier 153 which will be described later.

The movement plan creator 140 creates a target trajectory in which the vehicle M will travel autonomously (without requiring a driver's operation) in the future such that the vehicle M can travel in a recommended lane determined by the recommended lane determiner 61 in principle and cope with a surrounding situation of the vehicle M. A target trajectory includes, for example, a speed element. For example, a target trajectory is expressed by sequentially arranging points (trajectory points) at which the vehicle M is to arrive. Trajectory points are points at which the vehicle M is to arrive at intervals of a predetermined traveling distance (for example, about several [m]) along a road, and a target speed and a target acceleration at intervals of a predetermined sampling time (for example, below the decimal point [sec]) are created as a part of the target trajectory in addition. Trajectory points may be positions at which the vehicle M is to arrive at sampling times every predetermined sampling time. In this case, information of a target speed or a target acceleration is expressed by intervals between the trajectory points.

The movement plan creator 140 may set events (functions) of automated driving in creating a target trajectory. The events of automated driving include a constant-speed travel event, a low-speed following travel event, a lane change event, a branching event, a merging event, and an overtaking event. The movement plan creator 140 creates a target trajectory based on an event which is started.

The mode determiner 150 determines one of a plurality of driving modes with different tasks to be imposed on a driver (in other words, a plurality of modes with different automation levels) as a driving mode of the vehicle M. The mode determiner 150 includes, for example, a driver state determiner 151, a first acquirer 152, an identifier 153, and a mode change processor 154. These individual functions will be described later. The first acquirer 152 is an example of an "acquirer."

FIG. 3 is a diagram illustrating an example of correspondence between driving modes and control states of the vehicle M and tasks. In the example illustrated in FIG. 3, examples of a driving mode of the vehicle M include five modes including modes A to E. In FIG. 3, it is assumed that modes A and B are an example of a "first driving mode," and modes C, D, and E are an example of a "second driving mode." The driving mode may include a mode other than modes A to E, or may include a driving mode other than the first driving mode and the second driving mode. In modes A to E, a control state, that is, an automation level (a degree of control) of driving control of the vehicle M, is the highest in mode A, decreases in the order of mode B, mode C, and mode D, and is the lowest in mode E. On the other hand, tasks to be imposed on a driver (an occupant) are the lightest in mode A, become heavier in the order of mode B, mode C, and mode D, and are the heaviest in mode E in which manual driving is performed. In mode B to E, since the control state is not automated driving, the automated driving control device 100 has to end control associated with automated driving and take charge of transitioning to driving support or manual driving. Details of the driving modes will be exemplified below.

In mode A, the control state is an automated driving state and none of surrounding monitoring of the vehicle M and grasping of the steering wheel 82 (hereinafter referred to as steering wheel grasp) is imposed on a driver. The surrounding monitoring includes at least monitoring in the traveling direction (for example, forward monitoring) of the vehicle M. Forward monitoring means monitoring a space in the traveling direction of the vehicle M which is seen through a front windshield. Even in mode A, the driver is requested to take a posture that can rapidly transition to manual driving in response to a request from a system centered on the automated driving control device 100. Automated driving mentioned herein means that both steering and speed of the vehicle M are controlled without requiring a driver's operation. For example, mode A is a driving mode which is executable when conditions that the vehicle M is traveling at a predetermined speed (for example, about 50 [km/h]) or lower on a motorway such as a highway and a preceding vehicle to be followed is present are satisfied, and is also referred to as traffic jam pilot (TJP). When the conditions are not satisfied, the mode determiner 150 changes the driving mode of the vehicle M to mode B.

When mode A is being executed, an occupant can perform a second task. The second task is, for example, an action of the occupant which is permitted when the vehicle M is performing automated driving other than driving of the occupant. For example, the second task includes watching of a television program, use (for example, calling, mail transmission/reception, use of a social networking service (SNS), or web browsing) of a terminal device (for example, a smartphone or a tablet terminal) which is carried by the occupant, or eating of a meal.

In mode B, the control state is a driving support state, a task for monitoring the surroundings of the vehicle M (hereinafter referred to as surrounding monitoring) is imposed on a driver, and a task for grasping the steering wheel 82 is not imposed on the driver. For example, in mode B, a lane change instruction from an occupant is not received and lane change of the vehicle M based on settings of a route to a destination in the navigation device 50 or the like is performed on the basis of a determination result from the vehicle system 1 side. Lane change is to move the vehicle M from a traveling lane on which the vehicle M is traveling to a neighboring lane adjacent to the traveling lane and may include lane change based on branching or merging. A driving identity in modes A and B is the vehicle system 1.

In mode C, the control state is a driving support state, and the task for monitoring the surroundings and the task for grasping the steering wheel 82 are imposed on a driver. For example, in mode C, when the vehicle system 1 determines that lane change of the vehicle M is necessary, an occupant is inquired of via the HMI 30, and driving support for performing lane change is performed when an approval for lane change from the occupant is received via the HMI 30 or the like. Lane change control in modes B and C is performed by a system identity.

Mode D is a driving mode in which a driver's driving operation to a certain extent is required for at least one of steering and acceleration/deceleration of the vehicle M. For example, in mode D, driving support such as adaptive cruise control (ACC) or lane keeping assist system (LKAS) is performed. In mode D, when an instruction to perform lane change of the vehicle M is received through a driver's operation of the direction indicator switch 32, driving support for performing lane change in an instructed direction is performed. The lane change in mode D is lane change according to a driver's intention. The driver's operation of the direction indicator switch 32 is an example of a driving operation. The driving operation in mode D may include a driving operation for controlling steering or acceleration/deceleration.

In mode E, the control state is a manual driving state in which a driver's driving operation is required for both steering and acceleration/deceleration of the vehicle M. In modes D and mode E, the task for monitoring the surroundings of the vehicle M is imposed on a driver. The driving identity in modes C to E is a driver.

The mode determiner 150 changes the driving mode of the vehicle M to a driving mode with heavier tasks when a task associated with the determined driving mode is not performed by a driver.

For example, in mode A, when a driver takes a posture with which the driver cannot transition to manual driving in response to a request from a system (for example, when the driver is looking outside of a permitted area or when a sign for making driving difficult is detected), the mode determiner 150 causes the HMI controller 170 to perform control such that the driver is prompted to transition to manual driving in mode E using the HMI 30. The mode determiner 150 performs control such that the vehicle M is put on a target position (for example, a road edge) and slowly stopped and automated driving is stopped when the driver does not respond within a predetermined time after the HMI controller 170 has been caused to perform control for prompting the driver to transition to manual driving or when it is estimated that the driver has not taken a posture for manual driving. After automated driving has been stopped, the vehicle M is in mode D or E, and thus the vehicle M can be started by the driver's manual operation. This is the same for "stopping of automated driving."

When a driver is not monitoring a space in front of the vehicle in mode B, the mode determiner 150 prompts the driver to perform forward monitoring using the HMI 30 and performs control such that the vehicle M is put on a target position and slowly stopped and automated driving is stopped when the driver does not respond. In mode C, when a driver does not perform forward monitoring or when the driver does not grasp the steering wheel 82, the mode determiner 150 prompts the driver to perform forward monitoring and/or grasping of the steering wheel 82 using the HMI 30 and performs control such that the vehicle M is put on a target position and slowly stopped and automated driving is stopped when the driver does not respond.

The driver state determiner 151 determines whether an occupant (a driver) is suitable for driving. For example, the driver state determiner 151 monitors a driver's state for the mode change and determines whether the driver's state is a state corresponding to a task. For example, the driver state determiner 151 performs a posture estimating process by analyzing an image captured by the driver monitoring camera 70 and determines whether the driver takes a posture with which the driver cannot transition to manual driving in response to a request from the system. The driver state determiner 151 performs a gaze estimating process by analyzing an image captured by the driver monitoring camera 70 and determines whether the driver is monitoring the surroundings of the vehicle M (more specifically, a space in front of the vehicle). When it is determined that the driver is not in the state corresponding to the task for a predetermined time or more, the driver state determiner 151 determines that the driver is not suitable for driving corresponding to the task. When it is determined that the driver is in the state corresponding to the task, the driver state determiner 151 determines that the driver is suitable for driving corresponding to the task. The driver state determiner 151 may determine whether an occupant is in a state in which driver turnover is possible.

The first acquirer 152 acquires the first map information 54. The first acquirer 152 acquires reference information for identifying the position of the vehicle M. The reference information is, for example, position information of the vehicle M detected by the vehicle sensor 40 or a camera image captured by the camera 10. The reference information may include some or all of recognition results from the recognizer 130.

The identifier 153 identifiers the traveling lane of the vehicle M out of one or more lanes included in a road on which the vehicle M is traveling with reference to the first map information 54 on the basis of the position information of the vehicle M included in the reference information. For example, the identifier 153 sets a traveling lane (a reference lane) of the vehicle M (hereinafter referred to as "reference lane setting" according to necessity) at a predetermined timing, or detects the traveling lane of the vehicle M on the basis of change in behavior of the vehicle M (for example, lane change) after the reference lane has been set or change in a road shape (for example, an increase or decrease in the number of lanes) including the traveling lane and corrects the traveling lane (hereinafter also referred to as "lane tracking" according to necessity). The predetermined timing may be, for example, a predetermined cycle or a timing at which execution of automated driving is started, a timing at which traveling on a predetermined road such as a highway is started, or a timing at which a road section is switched in the first map information 54. The predetermined timing may be, for example, a timing at which a current traveling lane is reset and identification of a traveling lane is required again, a timing at which the traveling lane of the vehicle M is not identified and a road does not change within a predetermined distance, or a timing at which an operation of starting automated driving is performed by an occupant. Details of the function of the identifier 153 will be described later.

The mode change processor 154 determines a driving mode of the vehicle M on the basis of determination results from the driver state determiner 151 or identification results from the identifier 153, or the like. The mode change processor 154 may determine that a driving mode which is being executed will be maintained or that the driving mode will be switched to another mode. The mode change processor 154 performs various processes for change to the driving mode determined by the mode determiner 150. For example, the mode change processor 154 instructs a driving support device (not illustrated) to operate, outputs information for prompting a driver to act from the HMI controller 170 to the HMI 30, or instructs the movement plan creator 140 to create a target trajectory corresponding to a driving mode.

The second controller 160 controls the travel driving force output device 200, the brake device 210, and the steering device 220 such that the vehicle M travels along the target trajectory created by the movement plan creator 140 as scheduled.

The second controller 160 includes, for example, a second acquirer 162, a speed controller 164, and a steering controller 166. The second acquirer 162 acquires information of the target trajectory (trajectory points) created by the movement plan creator 140 and stores the acquired information in a memory (not illustrated). The speed controller 164 controls the travel driving force output device 200 or the brake device 210 on the basis of a speed element accessory to the target trajectory stored in the memory. The steering controller 166 controls the steering device 220 on the basis of a curved state of the target trajectory stored in the memory. The processes of the speed controller 164 and the steering controller 166 are realized, for example, in combination of feed-forward control and feedback control. For example, the steering controller 166 performs control in combination of feed-forward control based on a curvature of a road in front of the vehicle M and feedback control based on a separation from the target trajectory.

The HMI controller 170 notifies an occupant of predetermined information using the HMI 30. The predetermined information includes, for example, information associated with traveling of the vehicle M such as information on the state of the vehicle M or information on driving control. The information on the state of the vehicle M includes, for example, a speed, an engine rotation speed, and a shift position of the vehicle M. The information on driving control includes, for example, an inquiry about whether lane change is to be performed, information indicating what driving mode is to be executed, information on change of a driving mode, information of a task imposed on an occupant (task request information for an occupant) required for switching the driving mode, and information on a situation of driving control (for example, details of an event which is being performed). The predetermined information may include information not associated with traveling control of the vehicle M such as television programs and contents (for example, movies) stored in a storage medium such as a DVD. The predetermined information may include, for example, a current position or a destination of the vehicle M, information on an amount of fuel remaining, information indicating whether a traveling lane of the vehicle M has been identified, a residual distance until the driving mode is switched, an increasing/decreasing direction in the number of lanes, the number of increased/decreased lanes, and the number of lanes parallel to the traveling lane (the number of parallel lanes).

For example, the HMI controller 170 may generate an image including the predetermined information and display the generated image on a display device of the HMI 30, or may generate vocal sound indicating the predetermined information and output the generated vocal sound from a speaker of the HMI 30. The HMI controller 170 may output the information received by the HMI 30 to the communication device 20, the navigation device 50, the first controller 120, and the like.

The travel driving force output device 200 outputs a travel driving force (a torque) for allowing the vehicle to travel to driving wheels. The travel driving force output device 200 includes, for example, a combination of an internal combustion engine, an electric motor, and a transmission and an electronic control unit (ECU) that controls them. The ECU controls the elements on the basis of information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second controller 160 or the information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the driving operator 80 to change the direction of the turning wheels.

Function of Identifier and Details of Driving Control

Details of the function of the identifier 153 and details of driving control based on processes of the identifier 153 will be described below. In the following description, it is assumed that the driver state determiner 151 determines that a driver appropriately performs a task which is imposed on the driver according to the driving mode and the driving mode is determined on the basis of process details of the identifier 153. When the driver state determiner 151 determines that the driver is not performing a task imposed thereon according to the driving mode, the mode determiner 150 determines change to a mode corresponding to a task which is being performed by the driver or determines that control for stopping automated driving is performed.

Figure 4:
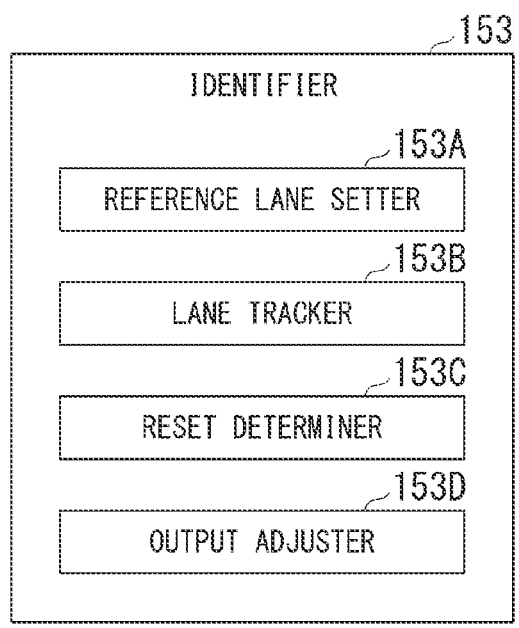
FIG. 4 is a diagram illustrating a functional configuration of an identifier.

The identifier 153 identifies the traveling lane of the vehicle M, for example, on the basis of type information of lane markings acquired from an image captured by the camera 10 (the first camera or one or both of the first camera and the second camera when the second camera is provided) or information of an object capable of identifying a lane position. FIG. 4 is a diagram illustrating a functional configuration of the identifier 153. The identifier 153 includes, for example, a reference lane setter 153A, a lane tracker 153B, a reset determiner 153C, and an output adjuster 153D.

Figure 5:
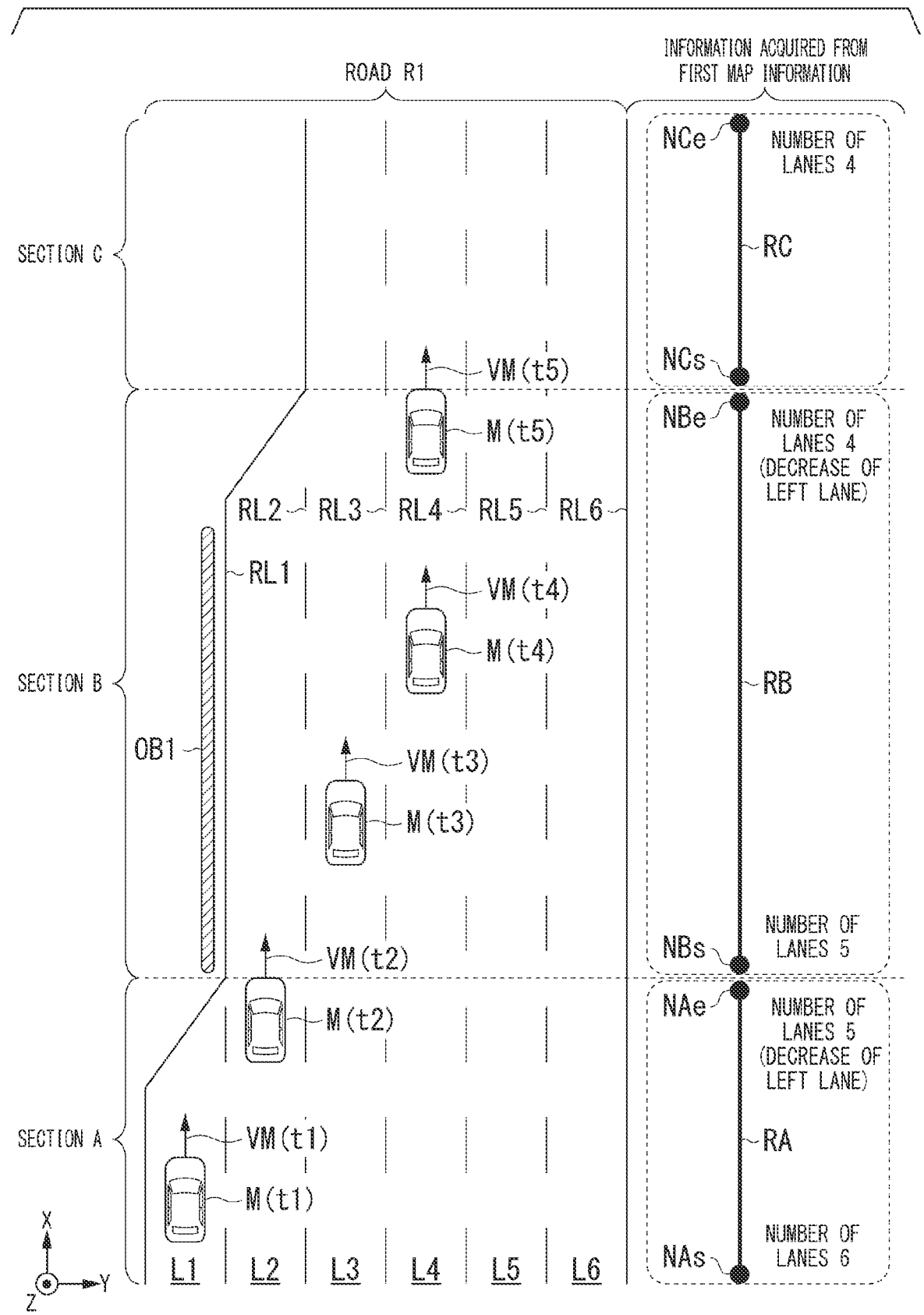
FIG. 5 is a diagram illustrating identification of a traveling lane based on a traveling situation of a vehicle.

FIG. 5 is a diagram illustrating identification of a traveling lane on the basis of a traveling situation of the vehicle M. In FIG. 5, an example in which the vehicle M is traveling at a speed VM on a road R1 is illustrated. In the example illustrated in FIG. 5, it is assumed that time t1 is the earliest, times t2, t3, t4, and t5 are increasingly later in this order, and a position and a speed of the vehicle M at time t* are represented by M(t*) and VM(t*). The road R1 includes predetermined road sections (for example, sections A to C) in an extending direction thereof. The road R1 (sections A to C) is, for example, a highway. Each section may be separated, for example, by points of change in a road shape (for example, points at which a branching road, a merging road, a curved road, or a tunnel is present) or may be divided for each predetermined length. Section B in FIG. 5 is a section in which the number of lanes is one less than the number of lanes in section A, and section C is a section in which the number of lanes is one less than the number of lanes in section B. Lanes L1 to L6 in section A, lanes L2 to L6 in section B, and lanes L3 to L6 in section C are lanes extending in the X-axis direction in FIG. 5. In FIG. 5, an object OB1 such as a guard rail which is provided in the extending direction of the lanes is illustrated.

In the first map information 54, node information, link information, and information on the number of lanes are stored for each of sections A to C as illustrated in FIG. 5. The information on the number of lanes may include an increasing/decreasing direction of the number of lanes, and the number of increased/decreased lanes. For example, the first acquirer 152 acquires a start point, an end point, and a road shape of section A as nodes NAs and NAe and link RA from the first map information 54 and acquires information indicating that the number of lanes decreases from six to five and the number of left lanes decreases. Similarly, the first acquirer 152 acquires road information of section B as nodes NBs and NBe and link RB and acquires information indicating that the number of lanes decreases from five to four and the number of left lanes decreases. The first acquirer 152 acquires road information of section C as nodes NCs and NCe and link RC and acquires information indicating that the number of lanes is four. In the example illustrated in FIG. 5, section A represents a merging section, and the first driving mode is started at a timing (time t2 in the drawing) at which the vehicle M merges from a merging road (a merging lane) L1 to a main lane (lane L2) which is a merged lane. The merged lane is, for example, a lane parallel to the merging road. Identification of a traveling lane based on traveling situations of the vehicle M at times t1 to t5 in FIG. 5 will be described below using the constituents of the identifier 153 illustrated in FIG. 4.

Times t1 to t2

Times t1 to t2 indicate positions of the vehicle M in which the vehicle performs lane change from a position of a branching lane L1 (time t1) to a main lane (lane L2) and enters section B at a time point (time t2). At time t2 at which the vehicle merges to the main lane L2, the reference lane setter 153A sets a traveling lane of the vehicle M at a time point at which the vehicle M starts the first driving mode as a reference lane on the basis of line type information of markings of lanes L2 to L6 based on a camera image captured by the camera 10 and recognized by the recognizer 130 and information of an object capable of identifying a position of a lane.

Specifically, first, the recognizer 130 recognizes lane markings or an object capable of identifying lane positions on an image plane by analyzing an image (a camera image) of the road R1 on which the vehicle M is traveling and which is captured by the camera 10, extracting edge points with a large difference in luminance from neighboring pixels in the image, and arranging the extracted edge points. The recognizer 130 may perform extraction of a feature quantity or extraction of image information through an image emphasizing process, or the like on the image and recognize the lane markings or the object through a matching process with reference to the extracted image information, a predefined pattern matching model, and the like. The recognizer 130 recognizes type information such as a type (a solid line or a dotted line) or a color for each lane marking on the basis of the result of image analysis. The recognizer 130 may recognize a type of an object. The recognizer 130 may recognize a positional relationship between the recognized lane markings or objects or a positional relationship (a relative position) between the lane markings or the objects and the vehicle M. At time t2 illustrated in FIG. 5, the recognizer 130 recognizes types or position information of solid lines RL1 and RL6, dotted lines RL3 to RL5, and an object OB1. The result of recognition from the recognizer 130 may be acquired as a part of reference information by the first acquirer 152.

Then, the reference lane setter 153A sets a traveling lane of the vehicle M out of one or more lanes included in the road on which the vehicle M travels as a reference lane on the basis of the reference information acquired by the first acquirer 152. Setting of the reference lane is to identify the traveling lane. For example, the reference lane setter 153A determines whether the vehicle M is traveling in one lane (lane L2 or lane L6) of right and left end lanes of the road RF For example, the reference lane setter 153A determines that the vehicle M is traveling in the left end lane (lane L2)

of the road R1 when a lane marking for defining the left end of the traveling lane of the vehicle M is a solid line, and determines that the vehicle M is traveling in the right end lane (lane L6) of the road R1 when a lane marking for defining the right end of the traveling lane is a solid line. When lane markings on the right and left sides of the traveling lane of the vehicle M are dotted lines (the lane marking on one of the right and left sides is not a solid line), the reference lane setter 153A determines that the vehicle M is not traveling in the right and left end lanes. The reference lane setter 153A may determine whether the vehicle M is traveling in the right and left end lanes on the basis of an object such as a guard rail (an object capable of identifying a lane position) instead of (or in addition to) a solid line. For example, when the left lane marking of the traveling lane of the vehicle M is a solid line and an object OB1 is present in a place which is farther from the vehicle M than the lane marking and which is within a predetermined distance from the lane marking, the reference lane setter 153A determines that another lane marking is not present near the lane marking and determines that the vehicle M is traveling in the left end lane of the road. Then, the reference lane setter 153A sets the determined traveling lane as the reference lane. For example, when execution of automated driving is started, there is a high likelihood that the vehicle is traveling in an end lane out of a plurality of lanes included in the road, and an end lane of the road can be more accurately recognized than a lane other than the end lane. Accordingly, by determining whether the vehicle is traveling in the end lane as the reference lane, it is possible to more accurately set the reference lane.

When it is determined that the vehicle M is not traveling in the right and left end lanes, the reference lane setter 153A may set the reference lane on the basis of a combination of a position and a type of a lane marking recognized from a camera image and a current position of the vehicle M. For example, when the number of lane markings recognized on the left side of the vehicle M is two and the line types from the leftmost sequentially include a solid line and a dotted line as the result of analysis of the camera image, the reference lane setter 153A determines that the vehicle M is traveling in a second lane from the left end lane of the road. When the number of lane markings recognized on the right side of the vehicle M is four and the line types sequentially include a solid line, a dotted line, a dotted line, and a dotted line, the reference lane setter 153A may determine that the vehicle M is traveling in a fourth lane from the right end lane of the road.

When a state in which the traveling lane of the vehicle M has been determined is maintained for a predetermined time or more, the reference lane setter 153A may set the determined lane as the reference lane of the vehicle M. Accordingly, it is possible to curb erroneous setting of the reference lane. It is possible to curb frequent switching of the position of the traveling lane due to erroneous determination of a lane marking or the like.

In the example illustrated in FIG. 5, at time t2, the reference lane setter 153A sets the left end lane L2 (the first lane from the left end) of the road R1 at a time point at which the vehicle M enters section B as the reference lane. Since the number of lanes of the road on which the vehicle M is traveling can be ascertained from the first map information 54, the reference lane setter 153A may set the fifth lane from the right end of the road as the reference lane. The reference lane setter 153A may set lane numbers (for example, 1 to 5) of the lanes L2 to L6 and manage the reference lane using the set lane numbers. A lane number is, for example, a number corresponding to lane from the left end or the right end lane of the road. In this case, at time t2, the reference lane is set to a left reference lane number (a lane number with respect to the left end lane) 1 or a right reference lane number (a lane number with respect to the right end lane) 5. After the reference lane of the vehicle M has been set by the reference lane setter 153A, the lane tracker 153B performs correction based on detection (tracking) of the traveling lane with respect to the reference lane on the basis of behavior of the vehicle M or an increase/decrease (merging or branching) of the number of lanes of the road. Behavior of the vehicle M is, for example, lane change of the vehicle M. The behavior of the vehicle M may include, for example, a state in which lane change is not being performed (for example, a lane kept state by LKAS).

Time t3

Time t3 represents a position of the vehicle M after the vehicle M has performed lane change from lane L2 to lane L3. In this case, the lane tracker 153B determines that the vehicle M is traveling in lane L3 on the basis of type information of a lane marking based on the result of analysis of a camera image and a direction and a frequency of lane change. For example, the lane tracker 153B performs correction of the position (lane number) of the traveling lane of the vehicle M based on a previous lane number (the lane number of the reference lane herein) with reference to the lane change correction table 182 stored in the storage 180 on the basis of a line type (for example, a dotted line) of a lane marking between the traveling lane (reference lane) set by the reference lane setter 153A and a neighboring lane, a moving direction at the time of lane change, and a result of determination indicating whether the lane change has been completed.

FIG. 6 is a diagram illustrating an example of details of the lane change correction table 182. In the lane change correction table 182, for example, detection (correction) details of the traveling lane with respect to the left reference lane number and the right reference lane number are correlated with behavior of the vehicle M. For example, when driving support of LKAS is performed after the reference lane has been set by the reference lane setter 153A, lane change of the vehicle M has not been performed and thus the lane tracker 153B maintains the previous lane number. When the vehicle M is performing lane change from the current lane to a left neighboring lane (when left LC is being performed) or when the vehicle M is performing lane change from the current lane to a right neighboring lane (when right LC is being performed), lane change has not been completed and thus the lane tracker 153B maintains the previous lane number. When the traveling lane has been identified with respect to the left end of the road, the lane tracker 153B acquires a value obtained by subtracting 1 from the previous lane number as a new lane number of the traveling lane when lane change to the left neighboring lane has been completed, and acquires a value obtained by adding 1 to the previous lane number as a new lane number of the traveling lane when lane change to the right neighboring lane has been completed. When the traveling lane has been identified with respect to the right end of the road, the lane tracker 153B acquires a value obtained by adding 1 to the previous lane number as a new lane number of the traveling lane when lane change to the left neighboring lane has been completed, and acquires a value obtained by subtracting 1 from the previous lane number as a new lane number of the traveling lane when lane change to the right neighboring lane has been completed. "Lane change has been completed" means, for example, a case in which a traveling locus of the vehicle M (for example, a locus extending to the rear of the vehicle M using position information of the vehicle M acquired from the vehicle sensor 40) goes over a lane marking for defining the current traveling lane and a neighboring lane which is a lane change destination. "Lane change has been completed" means, for example, a case in which a reference position (for example, the center of gravity) of the vehicle M goes over a lane marking for defining the current traveling lane and a neighboring lane which is a lane change destination or a case in which the whole vehicle M or all wheels of the vehicle M are present in the neighboring lane which is a lane change destination. When behavior of the vehicle cannot be identified (when whether lane change has been completed cannot be recognized), the lane tracker 153B may acquire a lane number (for example, 0) indicating that a lane is undetermined (not tracked). At time t3, since lane change from the traveling lane L2 identified by the reference lane setter 153A to the right lane L3 has been completed, the traveling lane is identified as the left reference lane number 2 or the right reference lane number 4.

Time t4

Time t4 represents a position of the vehicle M after the vehicle M has performed lane change from lane L3 to lane L4 which is farther to the right side. In this case, the lane tracker 153B detects a current traveling lane (lane number) based on the previous lane number (the lane number corrected through tracking at time t3 herein) with reference to the lane change correction table 182 stored in the storage 180 on the basis of a line type of a lane marking (for example a dotted line) between the current traveling lane L3 and the neighboring lane L4, a moving direction when lane change is performed, and the result of determination indicating whether lane change has been completed.

In a period from time t2 to time t4, the lane tracker 153B may adjust an increasing/decreasing number from the reference lane number on the basis of the frequency of lane change in the same direction. For example, when lane change to the right side has been performed two times (when lane change to the left side has not been performed), the lane tracker 153B acquires a value which is obtained by adding 2 to the previous lane number when lane change with respect to the left side has been performed or obtained by subtracting 2 from the previous lane number when lane change with respect to the right side has been performed as a new reference lane number. At time t4, since lane change from the traveling lane L3 identified (corrected) through the previous lane tracking to the right lane L4 has been completed, the traveling lane is identified as the left reference lane number 3 or the right reference lane number 3.

For example, when a part of a lane marking near the vehicle M is hidden behind another nearby vehicle or cannot be recognized due to wearing of the lane marking or a surrounding environment such as weather in recognition of a surrounding situation in the recognizer 130, the lane tracker 153B may linearly interpolate the non-recognized part of the lane marking using a locus of the lane marking which has been previously recognized. Accordingly, even when a lane marking is not temporarily recognized, it is possible to identify the traveling lane and to maintain the first driving mode. When a lane marking cannot be recognized for a predetermined time or more, the interpolating process may not be performed to avoid continuation of interpolation more than required and it may be determined that the traveling lane is undetermined.

Time t5

When the number of lanes of the road including the traveling lane increases or decreases on the basis of the result of analysis of a camera image captured by the camera 10 or the first map information 54, the lane tracker 153B corrects the traveling lane of the vehicle M according to the number of increasing/decreasing lanes. Specifically, when the number of lanes of the road including the traveling lane of the vehicle M increases or decreases, the lane tracker 153B determines in which of the right and left lanes in an extending direction of the road increases or decreases.

Time t5 indicates a position of the vehicle M when the number of lanes of the road R1 including the traveling lane of the vehicle M decreases by one from the left end. In this case, the lane tracker 153B corrects the position of the traveling lane based on the number of lanes with reference to the lane increase/decrease correction table 184 stored in the storage 180.

FIG. 7 is a diagram illustrating an example of details of the lane increase/decrease correction table 184. In the lane increase/decrease correction table 184, for example, detection (correction) details of the traveling lane with respect to the left reference lane number and the right reference lane number are correlated with increase/decrease details of the number of lanes included in the road on which the vehicle M is traveling.

For example, in section B, when the number of lanes decreases from five lanes (lanes L2 to L6) to four lanes (lanes L3 to L6), one lane at the left end is reduced. Accordingly, when it is determined on the basis of a camera image or information acquired from the first map information 54 that one lane on the left side decreases, the lane tracker 153B corrects the traveling lane of the vehicle M on the basis of lane detection details of the traveling lane in which increase/decrease details correspond to "left decrease" with reference to the lane increase/decrease correction table 184. For example, when the lane numbers are based on the left end, the lane tracker 153B corrects the lane number from the lane number 2 by subtracting the number of decreasing lane 1 from the previous lane number (the right reference lane number 3). When the lane numbers are based on the right end, the lane tracker 153B maintains the previous lane number (the right reference lane number 3) (without performing correction).

In this way, it is possible to more accurately identify the traveling lane of the vehicle M on the basis of information indicating whether lane change of the vehicle M has been performed, an increase/decrease in the number of lanes of the traveling road, or the like. Accordingly, it is possible to execute the first driving mode on the basis of the identified traveling lane and to change a control level of the driving control in a more appropriate situation when there is branching or the like.

The lane tracker 153B may perform tracking of the traveling lane based on behavior of the vehicle M or an increase/decrease in the number of lanes of a road and setting of the traveling lane based on the result of analysis of a camera image in the reference lane setter 153A, compare the results thereof, and correct the traveling lane when both the traveling lanes match.

The lane tracker 153B may reset information of the identified current traveling lane of the vehicle M on the basis of the result of determination from the reset determiner 153C. For example, when the number of lanes of the road on which the vehicle M is traveling based on the result of analysis of a camera image is different from the number of lanes of the road on which the vehicle M is traveling and which is acquired from the first map information 54 on the basis of the position information of the vehicle M, the reset determiner 153C determines that the position information (the lane number) of the current traveling lane is to be reset. When the traveling lane set on the basis of the result of analysis of a camera image by the reference lane setter 153A is different from the traveling lane identified on the basis of the behavior of the vehicle tracked by the lane tracker 153B or the increase/decrease in the number of lanes, the reset determiner 153C determines that the position information (lane number) of the current traveling lane is to be reset.

Figure 8:
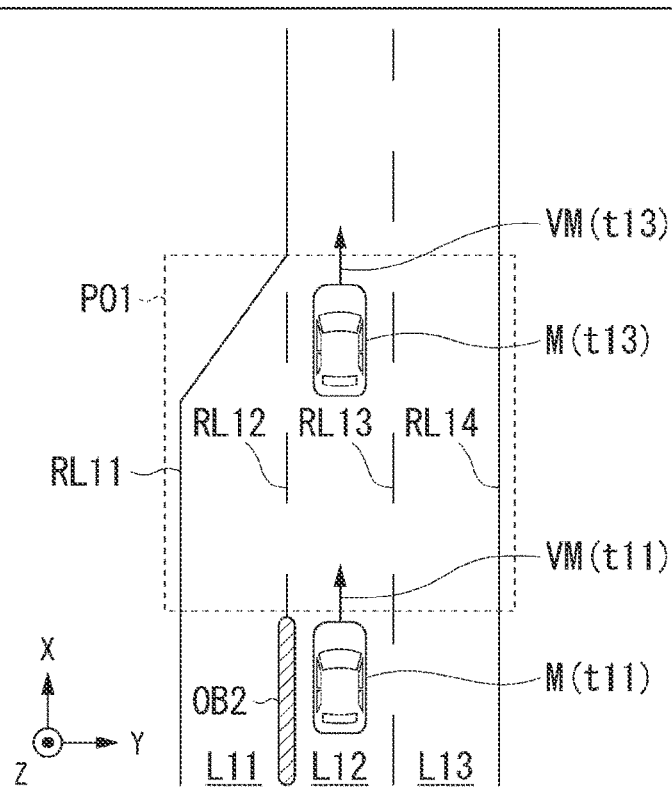
FIG. 8 is a diagram illustrating identification of a traveling lane based on behavior of a vehicle.
Figure 9:
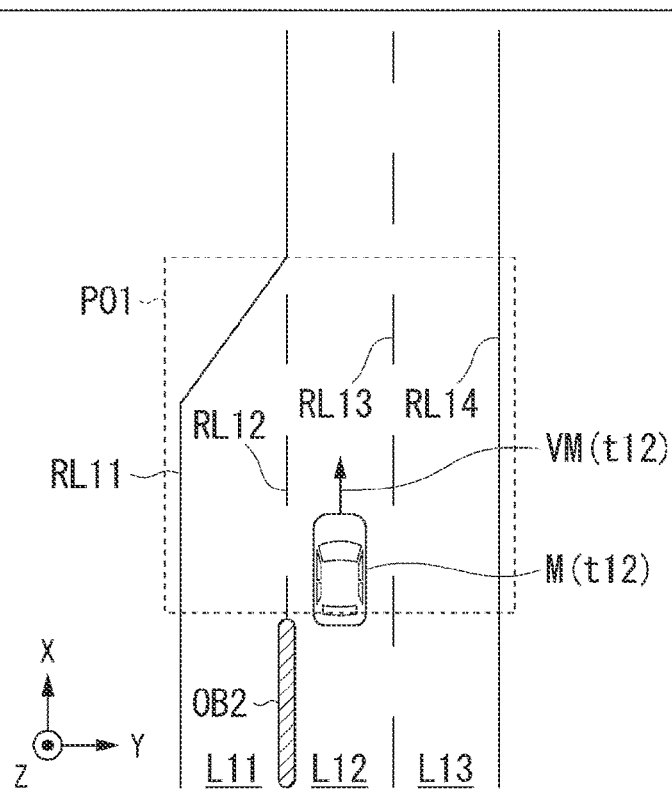
FIG. 9 is a diagram illustrating identification of a traveling lane based on a camera image.

FIG. 8 is a diagram illustrating identification of a traveling lane based on behavior of a vehicle. FIG. 9 is a diagram illustrating identification of a traveling lane based on a camera image. In the examples illustrated in FIGS. 8 and 9, it is assumed that the vehicle M travels on a lane L12 at a speed VM in a section (for example, a merging section) PO1 in which three lanes (lanes L11 to L13) decreases to two lanes (lanes L12 and L13). The lane L11 is an example of a merging road. The lane L12 is an example of a merged lane. In the examples of FIGS. 8 and 9, it is assumed that the lane L11 is defined by a solid line RL11 on the left side and a road structure (for example, a curbstone) OB2 and a dotted line RL12 on the right side, the lane L12 is defined by a road structure OB2 and a dotted line RL12 on the right side and a dotted line RL13 on the left side, and the lane L13 is defined by a dotted line RL13 on the left side and a solid line RL14 on the right side. In FIGS. 8 and 9, time t11 is the earliest, and t12 and t13 are later in this order.

In the example illustrated in FIG. 8, the lane tracker 153B recognizes that the vehicle M is traveling on the left end lane L12 of the road on the basis of the line types of the right and left lane markings at time t11. When a traveling lane is tracked on the basis of whether lane change is performed, lane change is not performed in a period from time t11 to time t13 (a period in which the vehicle passes through the section PO1) and thus the lane tracker 153B determines that the vehicle is continuously traveling on the left end lane. On the other hand, when the traveling lane of the vehicle M is identified on the basis of the result of analysis of a camera image at time t12 illustrated in FIG. 9, the lane tracker 153B recognizes that the vehicle is traveling on the second lane from the left end on the basis of the sold line of the lane marking RL11 and the dotted line of the lane marking RL12, and thus the traveling lanes do not match when management based on the left reference lane numbers is performed. This state can occur in a section in which the number of lanes increases or decreases such as a merging section or a branching section.

Accordingly, when the positions of the traveling lanes do not match as described above, the reset determiner 153C determines that the position information of the current traveling lane is to be reset. When it is determined that the position information of the traveling lane is to be reset by the reset determiner 153C, the lane tracker 153B outputs a reset request to the output adjuster 153D. The lane tracker 153B may output a reset flag indicating whether the position information of the traveling lane is to be reset to the output adjuster 153D.

Figure 10:
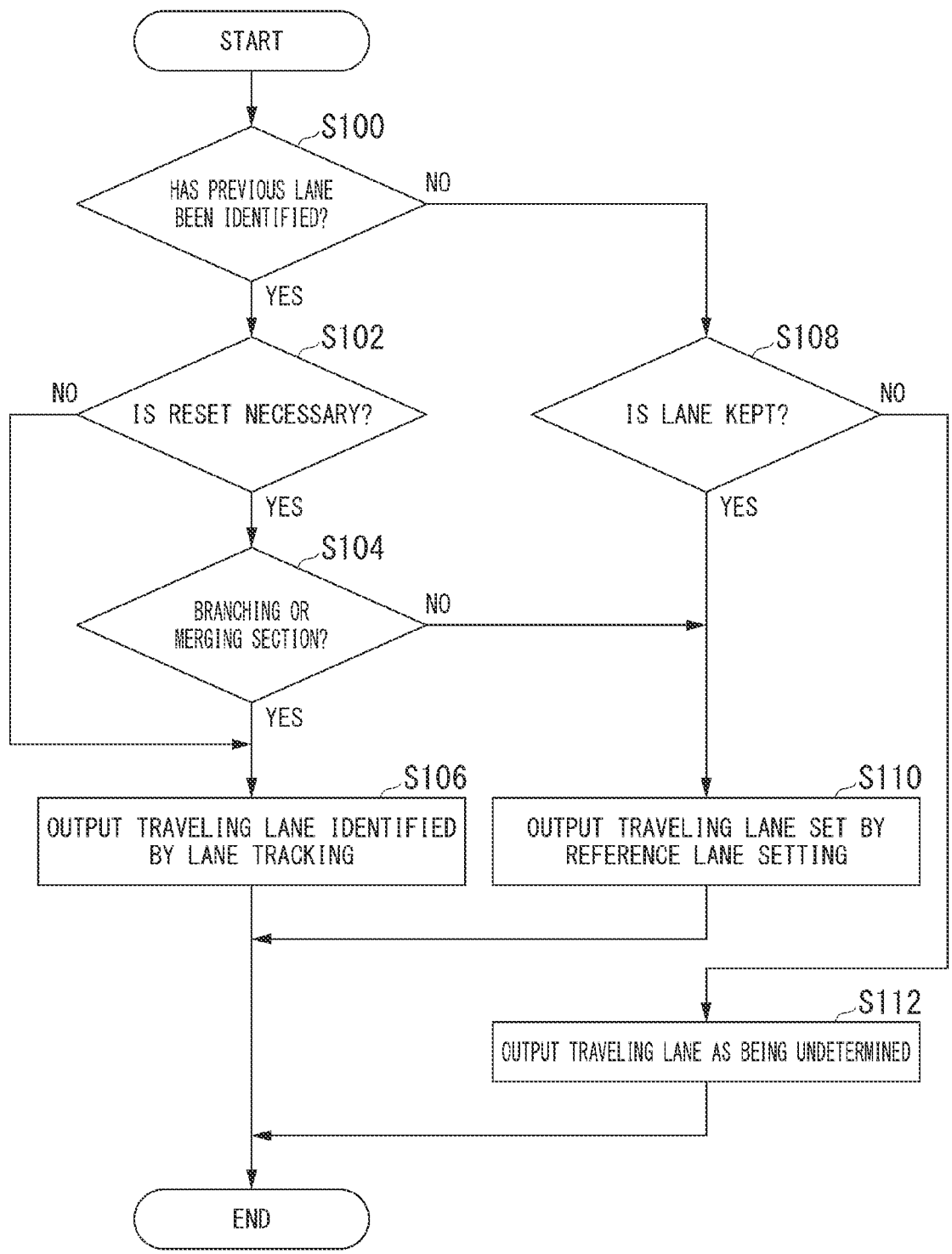
FIG. 10 is a flowchart illustrating an example of a routine which is performed by an output adjuster.

The output adjuster 153D performs a process of adjusting the traveling lane of the vehicle M on the basis of the reset flag or the reset request. For example, the output adjuster 153D performs output adjustment of the lane number on the basis of behavior of the vehicle M or an increase or decrease in the number of lanes (merging or branching). FIG. 10 is a flowchart illustrating an example of a routine of processes which is performed by the output adjuster 153D. In the example illustrated in FIG. 10, the output adjuster 153D determines whether a previous lane has been identified (Step S100). The previous lane is a traveling lane which is identified through previous lane tracking out of lane tracking which is performed at a predetermined timing. The previous lane may be a traveling lane which is set through setting of a reference lane. When the previous lane has been identified, the output adjuster 153D determines whether a reset request has been issued from the reset determiner 153C (Step S102).

When it is determined that a reset request has been issued, the output adjuster 153D determines whether a section in front of the vehicle M having issued the reset request is a branching or merging section (Step S104). In the process of Step S104, the output adjuster 153D determines whether a section in front of the vehicle M is a merging or branching section in which the number of lanes increases or decreases temporarily with reference to the first map information 54 on the basis of the position information of the vehicle M. When it is determined that the front section is a branching or merging section, the output adjuster 153D outputs the traveling lane identified through lane tracking (Step S106). When it is determined in Step S102 that a reset request has not been issued, the output adjuster 153D also performs the process of Step S106.

When it is determined in Step S100 that a previous lane has not been identified, the output adjuster 153D does not perform lane change or the like and determines whether the current lane is maintained through driving control such as LKAS (Step S108). When it is determined that the current lane is maintained, the output adjuster 153D outputs the traveling lane set through reference lane setting (Step S110). When it is determined in Step S104 that the front section is not a branching or merging section, the output adjuster 153D also performs the process of Step S110.

When it is determined in Step S108 that the current lane is not maintained (in other words, lane change is performed), the output adjuster 153D outputs information indicating that the traveling lane is undetermined (Step S112). In the process of Step S112, a process of outputting the corresponding information (for example, error information) from the HMI 30 via the HMI controller 170 or switching the first driving mode to the second driving mode or the like may be performed. Thereafter, the routine of the flowchart ends. By identifying the traveling lane through an adjustment process as described above, it is possible to more accurately identify the traveling lane and to more appropriately perform driving control using information of the identified traveling lane, for example, when the identified traveling lanes are different as illustrated in FIGS. 8 and 9.

Figure 11:
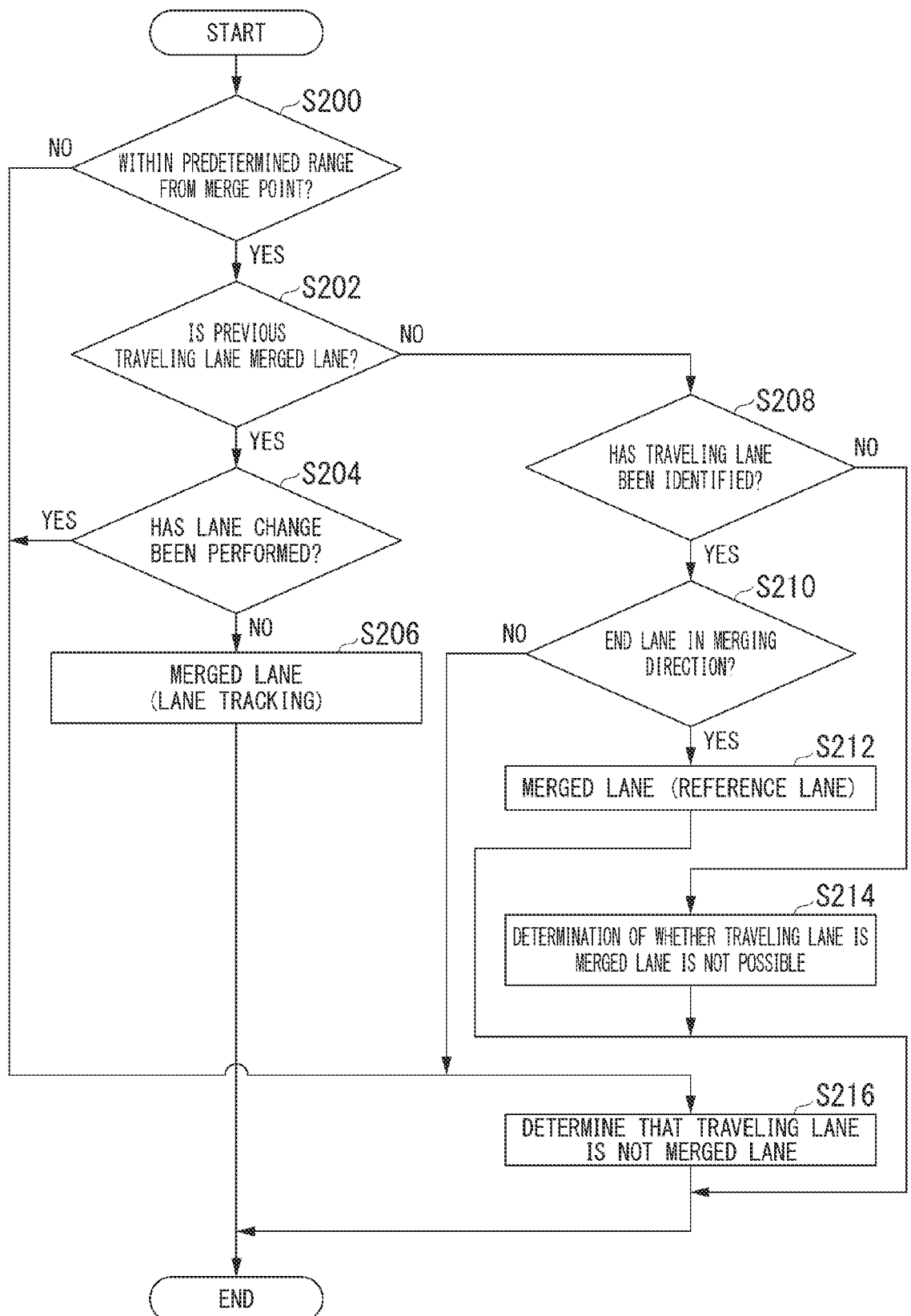
FIG. 11 is a flowchart illustrating a routine of determining a traveling lane in a merging section.

For example, when it is determined in Step S104 that the vehicle M is traveling in a merging section or a branching section, the output adjuster 153D may identify the traveling lane in additional consideration of lane types (for example, a merged lane, a takeover lane, or a branching lane). For example, when it is determined that the vehicle M is traveling in a merging section, the output adjuster 153D may determine whether the vehicle M is traveling on a merged lane. FIG. 11 is a flowchart illustrating an example of a routine of determining a traveling lane in a merging section. In the example illustrated in FIG. 11, the output adjuster 153D determines whether the position of the vehicle M is within a predetermined distance from a merging point (Step S200). When it is determined that the position of the vehicle M is within the predetermined distance, the output adjuster 153D determines whether a type of the previous traveling lane is a merged lane (Step S202). When it is determined that the type is a merged lane, the output adjuster 153D determines whether lane change is performed after the traveling lane has been previously identified (Step S204). When it is determined that lane change has not been performed, the output adjuster 153D determines that the traveling lane of the vehicle M is a merged lane and outputs the traveling lane identified through lane tracking (Step S206).

When it is determined in Step S202 that the previous lane is not a merged lane, the output adjuster 153D determines whether the traveling lane has been identified (Step S208). When it is determined that the traveling lane has been identified, the output adjuster 153D determines whether the traveling lane is an end lane in a merging direction (Step S210). When it is determined that the traveling lane is an end lane in the merging direction, the output adjuster 153D determines that the traveling lane of the vehicle M is a merged lane and outputs the traveling lane set through reference lane setting (Step S212).

When it is determined in Step S208 that the traveling lane has not been identified, the output adjuster 153D outputs information indicating that the traveling lane of the vehicle M is a merged lane cannot be determined (Step S214). When it is determined in Step S200 that the position of the vehicle M is not within from the predetermined distance from the merging point, when it is determined in Step S204 that lane change has been performed, or when it is determined in Step S210 that the traveling lane is not an end lane in the merging direction, the output adjuster 153D determines that the traveling lane of the vehicle M is not a merged lane (Step S216). Thereafter, the routine of the flowchart ends. In this way, by identifying a traveling lane in a merging section and ascertaining that the vehicle is traveling in a merged lane (a lane parallel to a merging road), it is possible to perform control based on a traveling situation such as putting an inter-vehicle distance or decelerating such that another vehicle can easily enter the merged lane from the merging road without performing lane change to the lane L11 in the first driving mode. The routine illustrated in FIG. 11 can be applied to a branching section. Accordingly, by identifying a traveling lane in a branching section and ascertaining that the vehicle is traveling in a branched lane (a lane parallel to a branching road), it is possible to perform more accurate driving control such as lane change to a lane for traveling to a destination or speed control.

The routine illustrated in FIG. 11 may be performed when the reference lane setter 153A or the lane tracker 153B identifies the traveling lane (sets the reference lane) of the vehicle M regardless of whether a reset request has been issued. For example, when it is determined that a section in front of the vehicle M is a merging or branching section with reference to the first map information 54 on the basis of the position information of the vehicle M, the lane tracker 153B identifies a traveling lane in the merging or branching section on the basis of a position of the identified traveling lane (or the set reference lane) whether the vehicle M has performed lane change before the vehicle reaches the section. For example, in the situation illustrated in FIG. 8 or 9, the lane tracker 153B identifies the lane L12 parallel to the merging road as the traveling lane in the section PO1 when the vehicle M is traveling on a merged lane (the left end lane L12) (traveling on the right end lane when the merging road is located on the right side) out of the lanes L12 and L13 parallel to the merging road (the lane L11). On the other hand, when the vehicle M is traveling in a lane parallel to the merging road and a state in which the vehicle M is determined to be traveling on a lane other than the right and left end lanes on the basis of type information of the lane markings is maintained for a predetermined time or more, the lane tracker 153B determines that the traveling lane is not undetermined and performs control for issuing a reset request or executing the second driving mode. The relationship between the merging road and the lane parallel to the merging road may be replaced with a relationship between a branching road and a lane parallel to the branching road. Accordingly, it is possible to more accurately identify the traveling lane in a section in which the number of lanes increases or decreases temporarily such as a merging road or a branching road.

For example, when the traveling lane of the vehicle M is identified, the mode change processor 154 executes a predetermined driving mode (for example, the first driving mode (mode A or mode B)) on the basis of the identified traveling lane. When the traveling lane of the vehicle M is undetermined (is not identified) (when the traveling lane is undetermined even through the adjustment process), the mode change processor 154 switches the first driving mode under execution (mode A or mode B) to the second driving mode (mode C, mode D, or mode E).

When the traveling lane of the vehicle M is undetermined, the mode change processor 154 may cause the vehicle M to travel while maintaining the driving mode under execution (without switching the driving mode). In this way, by maintaining the current driving mode without changing the driving control for the vehicle M, it is possible to realize traveling with priority on stability.

When the first driving mode is being executed and a section in which the traveling lane of the vehicle M is undetermined is within a predetermined distance, the mode change processor 154 may continue to execute the first driving mode. This is because driving control such as LKAS is possible when the traveling lane of the vehicle M cannot be identified out of one or more lanes included in the road but lane markings of the traveling lane are recognized. In this way, by clearly defining conditions that the first driving mode cannot be maintained, the mode determiner 150 can change to a safer driving mode in a section in which the conditions are satisfied.

When the driving mode executed by the vehicle M is switched from the first driving mode to the second driving mode, the HMI controller 170 generates information for prompting an occupant of the vehicle M to perform a task corresponding to the driving mode and outputs the generated information from the HMI 30. For example, the HMI controller 170 generates an image indicating specific details of the task to be performed by the occupant and outputs the generated image to a display device of the HMI 30. The HMI controller 170 may generate vocal sound data correlated with image information and output the generated data from a speaker of the HMI 30. The HMI controller 170 may notify the occupant that switching to the second driving mode is needed by outputting an alarm or the like. Accordingly, it is possible to allow the occupant to understand that the driving mode is switched or that a predetermined task is imposed on the occupant and to prepare for switching the driving mode. When the driving mode executed by the vehicle M is switched from the second driving mode to the first driving mode, the HMI controller 170 may output the changed driving mode or information indicating that the task imposed on the occupant changes (becomes heavier) to the occupant of the vehicle M from the HMI 30.

Process flow

A flow of a routine which is performed by the automated driving control device 100 according to the embodiment will be described below. In the following description, processes of identifying a traveling lane of a vehicle M and switching a driving mode on the basis of the identified traveling lane out of the processes performed by the automated driving control device 100 will be mainly described. The routine of the flowchart may be performed, for example, repeatedly at predetermined timings.

Figure 12:
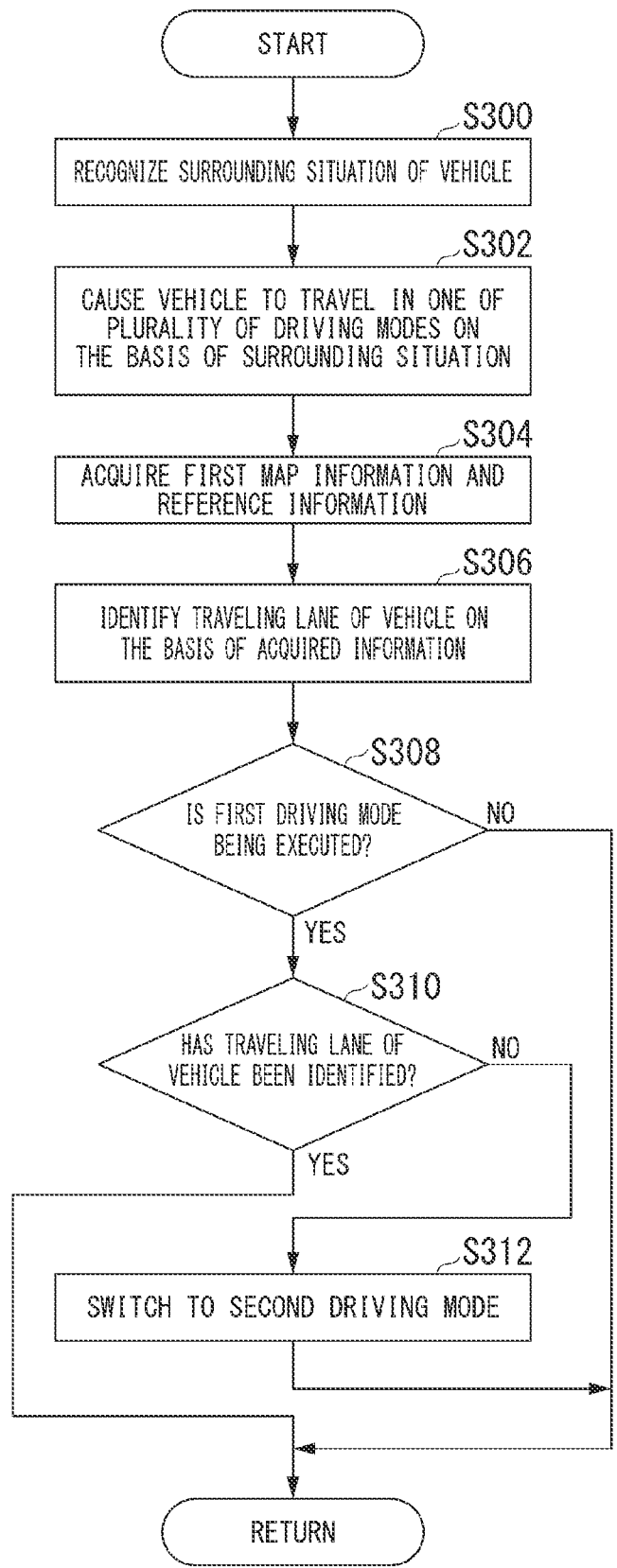
FIG. 12 is a flowchart illustrating an example of a routine of a driving control process which is performed by an automated driving control device.

FIG. 12 is a flowchart illustrating an example of a routine of a driving control process which is performed by the automated driving control device 100. In the example illustrated in FIG. 12, the recognizer 130 recognizes a surrounding situation of a vehicle M (Step S300). Then, the mode determiner 150 causes the vehicle to travel in one of a plurality of preset driving modes on the basis of the surrounding situation (Step S302).

Then, the mode determiner 150 acquires the first map information and reference information for identifying a position of the vehicle M (Step S304) and identifies a traveling lane of the vehicle M on the basis of the acquired information (Step S306). The process of Step S306 may include a process of setting a reference lane of the vehicle M. Then, the mode determiner 150 determines whether the vehicle M is executing the first driving mode (Step S308). When it is determined that the vehicle M is traveling in the first driving mode, the identifier 153 determines whether the traveling lane of the vehicle M is identified out of one or more lanes included in a road on which the vehicle M is traveling (Step S310). When it is determined that the traveling lane of the vehicle M is not identified (undetermined), the mode change processor 154 performs control for switching the driving mode of the vehicle M from the first driving mode to the second driving mode (Step S312). Thereafter, the routine of the flowchart ends. When it is determined in Step S308 that the vehicle is not traveling in the first driving mode, the routine of the flowchart ends.

Figure 13:
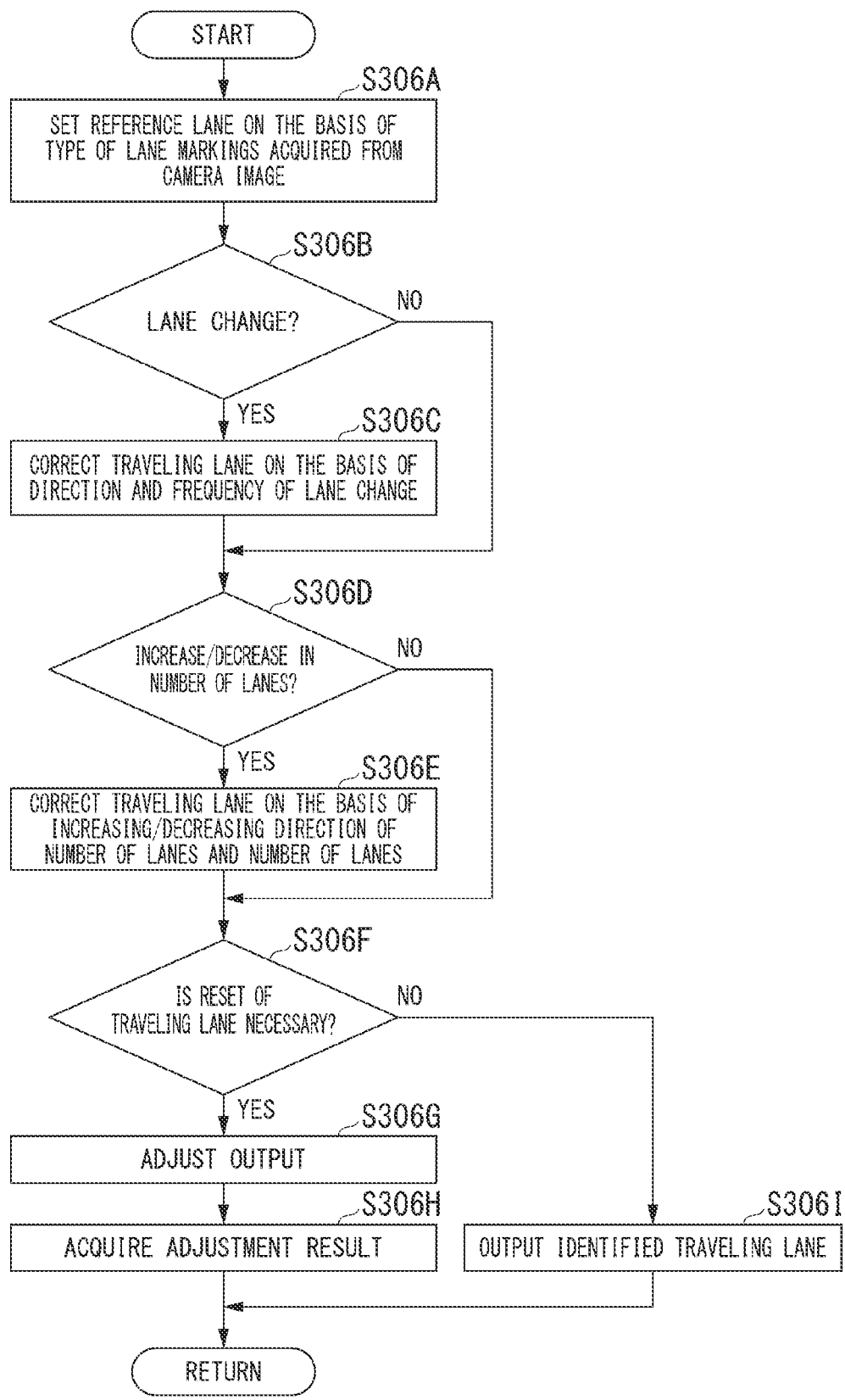
FIG. 13 is a flowchart illustrating an example of a routine of identifying a traveling lane of a vehicle.

FIG. 13 is a flowchart illustrating an example of a routine of identifying the traveling lane of the vehicle M. The routine illustrated in FIG. 13 represents details of the process of Step S306. In the routine illustrated in FIG. 13, the identifier 153 sets a reference lane on the basis of a type of lane markings near the vehicle M acquired from a camera image (Step S306A).

Then, the identifier 153 determines whether lane change has been performed (Step S306B) and corrects the position of the traveling lane on the basis of the direction and the frequency of lane change when it is determined that lane change has been performed (Step S306C). After the process of Step S306C has been performed or when it is determined in Step S306B that lane change has not been performed, the identifier 153 determines whether the number of lanes of the road including the traveling lane has increased or decreased (Step S306D). When it is determined that the number of lanes has increased or decreased, the identifier 153 corrects the traveling lane of the vehicle M on the basis of the increasing/decreasing direction of the number of lanes and the number of increased/decreased lanes (Step S306E).

After the process of Step S306E has been performed or when it is determined in Step S306D that the number of lanes has not increased or decreased, the identifier 153 performs reset determination of the traveling lane and determines whether reset is necessary (in other words, whether a reset request has been issued) (Step S306F). When it is determined that reset of the traveling lane is necessary, the identifier 153 adjusts information to be output as the traveling lane (Step S306G) and outputs the result of adjustment (Step S306H). When it is determined in Step S306F that reset of the traveling lane is not necessary, the identifier 153 outputs the identified traveling lane (which includes the corrected traveling lane) (Step S306I). Thereafter, the routine of the flowchart ends.

Modified Examples

In the aforementioned embodiment, reference lane setting and lane tracking may be performed again instead of performing the adjustment process in response to a reset request for the traveling lane. When the reference lane is set by the reference lane setter 153A, the driving controller may perform lane change such that the vehicle M is located on the right end lane or the left end lane of the road on which the vehicle M is traveling. Accordingly, it is possible to more accurately set the reference lane.

In the aforementioned embodiment, when map information (second map information) which is more precise than the first map information 54 is stored in addition to the first map information 54 and the second map information cannot be acquired, control for identifying the traveling lane using the first map information 54 or an image captured by the camera 10 and maintaining the first driving mode on the basis of the identified information may be performed.

The second map information is, for example, map information in which road information is defined for each lane in a section shorter than in the first map information 54. The second map information may include, for example, information of lane centers or information of lane boundaries. The second map information may include road information, traffic regulation information, address information (addresses and post codes), facility information, and phone number information. The second map information may be updated from time to time by allowing the communication device 20 to communicate with another device. For example, the second map information may be stored in a storage device such as an HDD or a flash memory of the MPU 60 or may be stored in the storage 180.

For example, when the second map information is stored in the MPU 60 or the storage 180, the recommended lane determiner 61 divides a route on a map provided from the navigation device 50 into a plurality of blocks and determines a recommended lane for each block with reference to the second map information. In this case, the recommended lane determiner 61 may determine which lane from the leftmost the vehicle M is to travel using lane information included in the second map information.

For example, when the vehicle M is executing the first driving mode and the second map information cannot be used due to a data abnormality of the second map information, an update abnormality of the second map information, or the like, the mode determiner 150 identifies the traveling lane of the vehicle M on the basis of the information acquired from the first map information 54 and maintains the first driving mode as described above. Accordingly, even in a situation in which the second map information cannot be used, it is possible to execute a driving mode with a high automation level.

In the aforementioned embodiment, when the first driving mode is switched to the second driving mode, the mode determiner 150 may determine to what of a plurality of modes included in the second driving mode the driving mode is to be switched according to a traveling state or a traveling environment of the vehicle M. The traveling state is, for example, a driver state which is determined by the driver state determiner 151. The traveling environment is, for example, a road shape near the vehicle M, the number of lanes, whether there is a branching or merging section, the number of nearby vehicles, or the relative positions of the nearby vehicles. For example, when conditions for switching from the first driving mode to the second driving mode are satisfied, the mode determiner 150 determines switching to mode C when the number of lanes in the case in which the traveling lane of the vehicle M cannot be identified is three, switching to mode D when the number of lanes is four, and switching to mode E when the number of lanes is five or more. Accordingly, it is possible to allow the vehicle M to travel in a more appropriate mode according to the traveling state or the traveling environment.

According to the aforementioned embodiment, the vehicle control device includes the recognizer 130 configured to recognize a surrounding situation of a vehicle M, the driving controller configured to control one or both of steering and speed of the vehicle M on the basis of the surrounding situation recognized by the recognizer 130, the acquirer (the first acquirer 152) configured to acquire map information (the first map information 54) including lane information near the vehicle M and reference information for identifying a position of the vehicle M, and the identifier 153 configured to identify a traveling lane of the vehicle out of one or more lanes included in a road on which the vehicle M is traveling from the map information on the basis of the reference information, and the identifier 153 is configured to set a reference lane on which the vehicle travels on the basis of the number of lanes of the road acquired from the map information and type information of lane markings near the vehicle recognized by the recognizer 130 or information of an object capable of identifying a lane position and to identify the traveling lane of the vehicle M on the basis of the set reference lane, the behavior of the vehicle M, and an increase or decrease in the number of lanes of the road. Accordingly, it is possible to more accurately identify a traveling lane of a vehicle. As a result, it is possible to maintain the first driving mode using information of an accurate traveling lane or to change a degree of control of driving control in a more appropriate situation.

According to the embodiment, when marking line types and arrangements thereof acquired from camera images conform to a predetermined rule (for example, road standards by country), it is possible to identify in which of a plurality of lanes (parallel lanes) the vehicle is traveling in combination of types. According to the embodiment, it is possible to more accurately correct the traveling lane by detecting an increase/decrease in the number of lanes using information on the number of lanes and an increasing/decreasing direction included in the map information.

According to the embodiment, it is possible to more accurately identify the position (the traveling lane) of the vehicle M and to continuously execute the first driving mode by using the same navigation map (the first map information 54) as used in the navigation device 50 without mounting more precise map information in the vehicle M. Accordingly, since frequent update of map information and management by a map server or the like are not necessary unlike a highly precise map, it is possible to reduce operation costs.

The above-mentioned embodiment can be expressed as follows:
a vehicle control device including:
a storage device that stores a program; and
a hardware processor,
wherein the hardware processor is configured to execute the program to perform:
recognizing a surrounding situation of a vehicle;
controlling one or both of steering and speed of the vehicle on the basis of the recognized surrounding situation;
acquiring map information including lane information near the vehicle and reference information for identifying a position of the vehicle;
identifying a traveling lane of the vehicle out of one or more lanes included in a road on which the vehicle is traveling from the map information on the basis of the reference information;
setting a reference lane on which the vehicle travels on the basis of the number of lanes of the road acquired from the map information and type information of recognized lane markings near the vehicle or information of an object capable of identifying a lane position; and
identifying the traveling lane of the vehicle on the basis of the set reference lane, behavior of the vehicle, and an increase or decrease in the number of lanes of the road.

The above-mentioned embodiment can also be expressed as follows:
a vehicle control device including:
a storage device that stores a program; and
a hardware processor,
wherein the hardware processor is configured to execute the program to perform:
recognizing a surrounding situation of a vehicle;
controlling one or both of steering and speed of the vehicle on the basis of the recognized surrounding situation;
acquiring map information including lane information near the vehicle and reference information for identifying a position of the vehicle;
identifying a traveling lane of the vehicle out of one or more lanes included in a road on which the vehicle is traveling from the map information on the basis of the reference information; and
identifying the traveling lane of the vehicle to be a lane parallel to a merging road or a branching road in a merging or branching section when the merging or branching section is located in front of the vehicle on the basis of the map information, the traveling lane before the vehicle reaches the merging or branching section is one of right and left end lanes included in the road, and it is determined that the vehicle has not performed lane change.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognizer configured to recognize a surrounding situation of a vehicle;
a driving controller configured to control one or both of steering and speed of the vehicle on the basis of the surrounding situation recognized by the recognizer;
an acquirer configured to acquire map information including lane information near the vehicle and reference information for identifying a position of the vehicle; and
an identifier configured to identify a traveling lane of the vehicle out of one or more lanes included in a road on which the vehicle is traveling from the map information on the basis of the reference information,
wherein the identifier is configured to set a reference lane on which the vehicle travels on the basis of the number of lanes of the road acquired from the map information and type information of lane markings near the vehicle recognized by the recognizer or information of an object capable of identifying a lane position and to identify the traveling lane of the vehicle on the basis of the set reference lane, behavior of the vehicle, and an increase or decrease in the number of lanes of the road, wherein the driving controller is configured to cause the vehicle to travel by operating in one of a plurality of driving modes including at least a first driving mode and a second driving mode in which a heavier task than that in the first driving mode is imposed on an occupant of the vehicle, wherein the driving controller is configured to perform the first driving mode when the traveling lane of the vehicle is identified by the identifier, and wherein the driving controller is configured to perform the second driving mode when the traveling lane of the vehicle is not identified by the identifier.

2. The vehicle control device according to claim 1, wherein the identifier is configured to identify the traveling lane of the vehicle on the basis of a combination of types of lane markings for defining one or more lanes near the vehicle recognized by the recognizer.

3. The vehicle control device according to claim 1, wherein the identifier is configured to acquire a section in which the number of lanes in front of the vehicle increases or decreases from the map information and to identify the traveling lane of the vehicle on the basis of an increase or decrease and an increasing or decreasing direction in the number of parallel lanes in the acquired section.

4. The vehicle control device according to claim 1, wherein the identifier is configured to cause the driving controller to perform the second driving mode when the vehicle is traveling on a lane parallel to a merging road or branching road and a state in which it is determined that the traveling lane is none of right and left end lanes on the basis of type information of lane markings recognized by the recognizer is maintained for a predetermined time or longer.

5. A vehicle control device comprising:
a recognizer configured to recognize a surrounding situation of a vehicle;
a driving controller configured to control one or both of steering and speed of the vehicle on the basis of the surrounding situation recognized by the recognizer;
an acquirer configured to acquire map information including lane information near the vehicle and reference information for identifying a position of the vehicle; and
an identifier configured to identify a traveling lane of the vehicle out of one or more lanes included in a road on which the vehicle is traveling from the map information on the basis of the reference information,
wherein the identifier is configured to identify the traveling lane in a merging or branching section on the basis of a position of the traveling lane before the vehicle reaches the merging or branching section and information indicating whether the vehicle has performed lane change when it is determined from the map information that the merging or branching section is located in front of the vehicle,
wherein the driving controller is configured to cause the vehicle to travel by operating in one of a plurality of driving modes including at least a first driving mode and a second driving mode in which a heavier task than that in the first driving mode is imposed on an occupant of the vehicle,
wherein the driving controller is configured to perform the first driving mode when the traveling lane of the vehicle is identified by the identifier, and
wherein the driving controller is configured to perform the second driving mode when the traveling lane of the vehicle is not identified by the identifier.

6. The vehicle control device according to claim 5, wherein, when a merging or branching section is located in front of the vehicle with reference to the map information, the traveling lane before the vehicle reaches the section is one of right and left end lanes included in the road, and it is determined that the vehicle has not performed lane change, the identifier is configured to identify the traveling lane of the vehicle to be a lane parallel to a merging road or a branching road in the section.

7. A vehicle control method that is performed by a computer, the vehicle control method comprising:
recognizing a surrounding situation of a vehicle;
controlling one or both of steering and speed of the vehicle on the basis of the recognized surrounding situation;
acquiring map information including lane information near the vehicle and reference information for identifying a position of the vehicle;
identifying a traveling lane of the vehicle out of one or more lanes included in a road on which the vehicle is traveling from the map information on the basis of the reference information;
setting a reference lane on which the vehicle travels on the basis of the number of lanes of the road acquired from the map information and type information of recognized lane markings near the vehicle or information of an object capable of identifying a lane position;
identifying the traveling lane of the vehicle on the basis of the set reference lane, behavior of the vehicle, and an increase or decrease in the number of lanes of the road;
causing the vehicle to travel by operating in one of a plurality of driving modes including at least a first driving mode and a second driving mode in which a heavier task than that in the first driving mode is imposed on an occupant of the vehicle;
performing the first driving mode when the traveling lane of the vehicle is identified; and
performing the second driving mode when the traveling lane of the vehicle is not identified.

8. A vehicle control method that is performed by a computer, the vehicle control method comprising:
recognizing a surrounding situation of a vehicle;
controlling one or both of steering and speed of the vehicle on the basis of the recognized surrounding situation;
acquiring map information including lane information near the vehicle and reference information for identifying a position of the vehicle;
identifying a traveling lane of the vehicle out of one or more lanes included in a road on which the vehicle is traveling from the map information on the basis of the reference information;
identifying the traveling lane of the vehicle to be a lane parallel to a merging road or a branching road in a merging or branching section when the merging or branching section is located in front of the vehicle on the basis of the map information, the traveling lane before the vehicle reaches the merging or branching section is one of right and left end lanes included in the road, and it is determined that the vehicle has not performed lane change;

causing the vehicle to travel by operating in one of a plurality of driving modes including at least a first driving mode and a second driving mode in which a heavier task than that in the first driving mode is imposed on an occupant of the vehicle, performing the first driving mode when the traveling lane of the vehicle is identified; and performing the second driving mode when the traveling lane of the vehicle is not identified.

9. A vehicle control device comprising:

a recognizer configured to recognize a surrounding situation of a vehicle;

a driving controller configured to control one or both of steering and speed of the vehicle on the basis of the surrounding situation recognized by the recognizer;

an acquirer configured to acquire map information including lane information near the vehicle and reference information for identifying a position of the vehicle; and an identifier configured to identify a traveling lane of the vehicle out of one or more lanes included in a road on which the vehicle is traveling from the map information on the basis of the reference information, wherein the identifier is configured to set a reference lane on which the vehicle travels on the basis of the number of lanes of the road acquired from the map information and type information of lane markings near the vehicle recognized by the recognizer or information of an object capable of identifying a lane position and to identify the traveling lane of the vehicle on the basis of the set reference lane, behavior of the vehicle, and an increase or decrease in the number of lanes of the road, wherein the driving controller is configured to cause the vehicle to travel by performing one driving mode of a plurality of driving modes with different tasks imposed on an occupant of the vehicle and to cause the vehicle to travel by maintaining the driving mode which is being performed when the traveling lane of the vehicle is not identified by the identifier.

10. A vehicle control device comprising:

a recognizer configured to recognize a surrounding situation of a vehicle;

a driving controller configured to control one or both of steering and speed of the vehicle on the basis of the surrounding situation recognized by the recognizer;

an acquirer configured to acquire map information including lane information near the vehicle and reference information for identifying a position of the vehicle; and an identifier configured to identify a traveling lane of the vehicle out of one or more lanes included in a road on which the vehicle is traveling from the map information on the basis of the reference information, wherein the identifier is configured to identify the traveling lane in a merging or branching section on the basis of a position of the traveling lane before the vehicle reaches the merging or branching section and information indicating whether the vehicle has performed lane change when it is determined from the map information that the merging or branching section is located in front of the vehicle, wherein the driving controller is configured to cause the vehicle to travel by performing one driving mode of a plurality of driving modes with different tasks imposed on an occupant of the vehicle and to cause the vehicle to travel by maintaining the driving mode which is being performed when the traveling lane of the vehicle is not identified by the identifier.

11. A vehicle control device comprising:

a recognizer configured to recognize a surrounding situation of a vehicle;

a driving controller configured to control one or both of steering and speed of the vehicle on the basis of the surrounding situation recognized by the recognizer;

an acquirer configured to acquire map information including lane information near the vehicle and reference information for identifying a position of the vehicle; and an identifier configured to identify a traveling lane of the vehicle out of one or more lanes included in a road on which the vehicle is traveling from the map information on the basis of the reference information, wherein the identifier is configured to set a reference lane on which the vehicle travels on the basis of the number of lanes of the road acquired from the map information and type information of lane markings near the vehicle recognized by the recognizer or information of an object capable of identifying a lane position and to identify the traveling lane of the vehicle on the basis of the set reference lane, behavior of the vehicle, and an increase or decrease in the number of lanes of the road, wherein the identifier is configured to reset information of the identified traveling lane when the traveling lane of the vehicle identified on the basis of the reference lane, the behavior of the vehicle, and the increase or decrease in the number of lanes of the road is different from the traveling lane of the vehicle identified on the basis of the lane markings near the vehicle recognized by the recognizer.

12. The vehicle control device according to claim 11, wherein the identifier is configured to identify the traveling lane of the vehicle on the basis of a shape of a road on which the vehicle travels and the behavior of the vehicle when the information of the traveling lane is reset.

13. A vehicle control method that is performed by a computer, the vehicle control method comprising:

recognizing a surrounding situation of a vehicle;

controlling one or both of steering and speed of the vehicle on the basis of the recognized surrounding situation;

acquiring map information including lane information near the vehicle and reference information for identifying a position of the vehicle;

identifying a traveling lane of the vehicle out of one or more lanes included in a road on which the vehicle is traveling from the map information on the basis of the reference information;

setting a reference lane on which the vehicle travels on the basis of the number of lanes of the road acquired from the map information and type information of recognized lane markings near the vehicle or information of an object capable of identifying a lane position; identifying the traveling lane of the vehicle on the basis of the set reference lane, behavior of the vehicle, and an increase or decrease in the number of lanes of the road; and causing the vehicle to travel by performing one driving mode of a plurality of driving modes with different tasks imposed on an occupant of the vehicle and causing the vehicle to travel by maintaining the driving mode which is being performed when the traveling lane of the vehicle is not identified.

14. A vehicle control method that is performed by a computer, the vehicle control method comprising:
recognizing a surrounding situation of a vehicle;
controlling one or both of steering and speed of the vehicle on the basis of the recognized surrounding situation;
acquiring map information including lane information near the vehicle and reference information for identifying a position of the vehicle;
identifying a traveling lane of the vehicle out of one or more lanes included in a road on which the vehicle is traveling from the map information on the basis of the reference information;
identifying the traveling lane of the vehicle to be a lane parallel to a merging road or a branching road in a merging or branching section when the merging or branching section is located in front of the vehicle on the basis of the map information, the traveling lane before the vehicle reaches the merging or branching section is one of right and left end lanes included in the road, and it is determined that the vehicle has not performed lane change; and
causing the vehicle to travel by performing one driving mode of a plurality of driving modes with different tasks imposed on an occupant of the vehicle and causing the vehicle to travel by maintaining the driving mode which is being performed when the traveling lane of the vehicle is not identified.

15. A vehicle control method that is performed by a computer, the vehicle control method comprising:
recognizing a surrounding situation of a vehicle;
controlling one or both of steering and speed of the vehicle on the basis of the recognized surrounding situation;
acquiring map information including lane information near the vehicle and reference information for identifying a position of the vehicle;
identifying a traveling lane of the vehicle out of one or more lanes included in a road on which the vehicle is traveling from the map information on the basis of the reference information;
setting a reference lane on which the vehicle travels on the basis of the number of lanes of the road acquired from the map information and type information of recognized lane markings near the vehicle or information of an object capable of identifying a lane position;
identifying the traveling lane of the vehicle on the basis of the set reference lane, behavior of the vehicle, and an increase or decrease in the number of lanes of the road; and
resetting information of the identified traveling lane when the traveling lane of the vehicle identified on the basis of the reference lane, the behavior of the vehicle, and the increase or decrease in the number of lanes of the road is different from the traveling lane of the vehicle identified on the basis of the lane markings near the vehicle recognized.

* * * * *